(12) United States Patent
Bennett et al.

(10) Patent No.: US 9,335,939 B2
(45) Date of Patent: May 10, 2016

(54) RAIDED MEMORY SYSTEM

(75) Inventors: Jon C. R. Bennett, Sudbury, MA (US); David M. Smith, Union City, CA (US); Daniel C. Biederman, San Jose, CA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 668 days.

(21) Appl. No.: 13/546,346

(22) Filed: Jul. 11, 2012

(65) Prior Publication Data

US 2013/0019062 A1    Jan. 17, 2013

Related U.S. Application Data

(60) Provisional application No. 61/506,772, filed on Jul. 12, 2011.

(51) Int. Cl.
*G06F 3/06* (2006.01)

(52) U.S. Cl.
CPC ............ *G06F 3/0614* (2013.01); *G06F 3/0659* (2013.01); *G06F 3/0688* (2013.01); *G06F 3/0689* (2013.01)

(58) Field of Classification Search
CPC ... G06F 3/0614; G06F 3/0659; G06F 3/0688; G06F 3/0689
USPC ......................................................... 711/114
See application file for complete search history.

(56) References Cited

U.S. PATENT DOCUMENTS

| | | | |
|---|---|---|---|
| 4,888,691 A * | 12/1989 | George et al. ................... 714/15 |
| 6,553,511 B1 | 4/2003 | DeKoning et al. |
| 6,851,023 B2 | 2/2005 | Noya et al. |
| 7,162,582 B2 * | 1/2007 | Horn et al. .................... 711/118 |
| 2008/0120463 A1 | 5/2008 | Ashmore |
| 2008/0250232 A1 | 10/2008 | Nakashima |
| 2009/0006738 A1 | 1/2009 | Lubbers et al. |
| 2009/0089489 A1 | 4/2009 | Mukaida et al. |
| 2009/0089536 A1 | 4/2009 | Norman et al. |
| 2009/0172257 A1 * | 7/2009 | Prins et al. .................... 711/103 |

(Continued)

FOREIGN PATENT DOCUMENTS

| | | |
|---|---|---|
| EP | 0 661 635 A1 | 12/1994 |
| KR | 10-2008-1002863 A | 12/2008 |
| WO | WO 2008/070173 A1 | 6/2008 |

OTHER PUBLICATIONS

International Search Report for International Application No. PCT/US2012/046487, dated Jan. 30, 2013, 2 pages.

(Continued)

*Primary Examiner* — Kalpit Parikh
(74) *Attorney, Agent, or Firm* — Brinks Gilson & Lione

(57) ABSTRACT

A memory system and a method for managing the system is described. The system is configured such a plurality of system controllers, which may be RAID controllers, receive requests from the external environment and distribute the requests to a plurality of memory modules such that data may be stored in the memory modules. A global sequence number is assigned to the data of a data stripe so that the operations related to the data stripe are performed in an ordered manner so that the data remains consistent. A plurality of system controllers may comprise a domain and access a plurality of memory controllers and a plurality of domains may include at least one common memory module.

53 Claims, 8 Drawing Sheets

| TUPLE (MMLSN, GSN, ...) | COMMAND | DATA PAYLOAD |
|---|---|---|
| 17,3100 | READ | LBA1 |
| 18,3101 | READ | LBA2 |
| X,3102 | SKIP | NIL |
| 19,3103 | WRITE | LBA4+DATA |
| 20,3104 | WRITE | LBA4+DATA |
| 21,3105 | READ | LBA4 |
| 22,3106 | READ | LBA3 |
| 23,3107 | WRITE | LBA3+DATA |
| ... | | |
| ... | | |

(56) References Cited

U.S. PATENT DOCUMENTS

2009/0228672 A1 9/2009 Uratani et al.
2009/0307426 A1 12/2009 Galloway et al.

OTHER PUBLICATIONS

Written Opinion of the International Searching Authority for related PCT patent application No. PCT/US2013/044527 mailing date Dec. 18, 2014.

European Extended Search Report for related Application No. EP 12810789.3, Aug. 1, 2015.
Response to Communication issued Jan. 27, 2015, for related Application No. EP 12810789.3.
Filing Receipt (Acknowledgement of receipt ) issued Jul. 27, 2015, for related Application No. EP 12810789.3.
Non-Final Office Action recieved in related U.S. Appl. No. 13/911,607, mailing date Apr. 7, 2015 (14 pgs).
Amendment and Response filed in related U.S. Appl. No. 13/911,607, filed Oct. 5, 2015 (12 pgs).

* cited by examiner

Local Sequence
Number (LSN)

| TUPLE (MMLSN, GSN, ...) | COMMAND | DATA PAYLOAD |
|---|---|---|
| 17,3100 | READ | LBA1 |
| 18,3101 | READ | LBA2 |
| 19,3103 | WRITE | LBA4+DATA |
| 20,3104 | WRITE | LBA4+DATA |
| 21,3105 | READ | LBA4 |
| 23,3107 | WRITE | LBA3+DATA |
| 22,3106 | READ | LBA3 |
| ... | | |
| ... | | |

FIG. 13

| TUPLE (MMLSN, GSN, ...) | COMMAND | DATA PAYLOAD |
|---|---|---|
| 17,3100 | READ | LBA1 |
| 18,3101 | READ | LBA2 |
| X,3102 | SKIP | NIL |
| 19,3103 | WRITE | LBA4+DATA |
| 20,3104 | WRITE | LBA4+DATA |
| 21,3105 | READ | LBA4 |
| 22,3106 | READ | LBA3 |
| 23,3107 | WRITE | LBA3+DATA |
| ... | | |
| ... | | |

FIG. 14

| COMMAND | GSN |
|---|---|
| ... | |
| ... | |
| WRITE | 511 |
| READ | 450 |
| WRITE | 315 |
| WRITE-r | 100 |
| READ | 272 |
| READ | 260 |
| WRITE | 223 |
| READ-r | 100 |

RAIDED MEMORY SYSTEM

The present application claims priority to U.S. provisional application No. 61/506,772, which was filed on Jul. 12, 2011, which is incorporated herein by reference.

BACKGROUND

Contemporary memory system architectures may demonstrate tradeoffs between cost, performance and the ability to upgrade, for example, the total memory capacity of the system. Memory capacity is commonly upgraded via memory modules or cards having a connector/socket interface. Often these memory modules are connected to a bus or interconnecting wiring disposed on a backplane to utilize system resources efficiently. In addition to upgradeability, many of these contemporary memory systems also require high throughput for bandwidth intensive applications, such as graphics, or data center memories.

System resources which may be considered in design include of a solid state memory system include, for example, integrated circuit die area, package pins, signal line traces, connectors, backplane board area and power and response speed.

Memories used in computing and communications systems include, but are not limited to, random access memory (RAM) of all types (e.g., S-RAM, D-RAM); programmable read only memory (PROM); electronically alterable read only memory (EPROM); flash memory (FLASH), magnetic memories of all types including Magnetoresistive Random Access Memory (MRAM), Ferroelectric RAM (FRAM or FeRAM) as well as NRAM (Nanotube-based/Nonvolatile RAM) and Phase-change memory (PRAM), and magnetic disk storage media. Other memories which may become suitable for use in the future include quantum devices and the like.

SUMMARY

A memory system is disclosed including, comprising a plurality of system controllers in communication with a plurality of memory controllers. The memory controllers are in communication with a plurality of memory modules.

A same command from a system controller of the plurality of system controllers may be associated with a data packet of a plurality of data packets and dispatched to at least one of the plurality of memory controllers of the plurality of memory controllers. When the commands and any associated data are received by all of the intended recipient memory controllers and acknowledged to the system controller, a same unique global serial number (GSN) is assigned to the same command at each of the memory controllers.

In some instances the same command may be a plurality of READ commands sent to one or more memory controller, and forwarded to memory modules in accordance with the address associated with each of the READ commands. This may be used to retrieve the strips of a stripe of a RAID group.

In other instances, the same command may be a plurality of WRITE commands sent to one or more memory controller, and forwarded to memory modules in accordance with the address associated with each of the WRITE commands. Each of the WRITE commands may have an associated data payload which may be a strip of a stripe of a RAID group. This may be used to write the strips of a stripe of a RAID group.

In still other instances, each of the READ or write commands sent to the memory controllers may have differing attributes, including acting as place markers to control the sequencing of operations in a destination memory module.

Further, groups of commands of differing types may be treated as same commands where the commands are part of an operation where the differing types commands need to be executed on the memory in a consistent and coordinated manner with respect to the global memory environment. This consistency may be achieved by assigning the group of commands comprising the same command a same GSN or sequential GSNs.

The global sequence number is locally unique with respect to a domain of system controllers and may be locally unique with respect to a group of characteristics, such as priority. At each memory controller, the command and any associated data is sent to the memory module to which it is addressed in order of increasing GSN.

At a memory module, the GSN may be used to order the sequence of operations performed with respect to a logical block address, such that the arrow of time of the data at the input to the memory system is preserved with respect to the data being written or read. When reading data, once the data has been reliably received at a system controller, the system controller may output the data when the data is available.

In another aspect, the GSN may be assigned to the same command prior to transmitting the command to the memory controllers.

A method of operating a memory system is disclosed, the method including the steps of receiving a request from an external source; converting the request into at least one command for operation of a memory controller of a plurality of memory controllers of the memory system; sending the command to at least one of the memory controllers; receiving an acknowledgment of receipt of the command from the all of the memory controllers to which the command was sent; assigning a global sequence number (GSN) to the command; associating the GSN with the command at the memory controller; and, for each memory module in communication with the memory controller: sending the command with the lowest GSN and addressed to the memory module to the memory module.

BRIEF DESCRIPTION OF THE DRAWINGS

FIG. 13 shows the content of a representative memory module data buffer at an epoch, where the a memory module serial number MMSN assigned by the memory controller MC is used so as to identify intended gaps in the GSN at a memory module;

FIG. 14 shows the contents of the representative memory module at an epoch where the MMSN sequence of FIG. 13 has been used to identify the intentional gap in GSN sequence, and the sequence has also been reordered to accommodate an out of order receipt of GSN 3016 and 3017;

DETAILED DESCRIPTION

Figure 1:
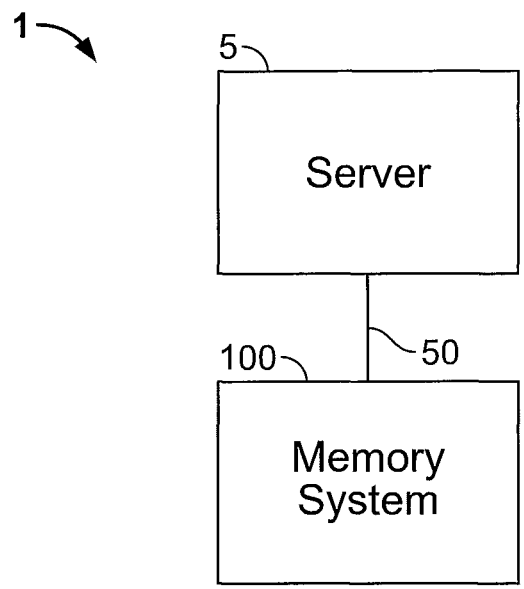
FIG. 1 shows a block diagram of a computing system comprising a server and a memory system.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded. When a particular aspect, feature, structure, or characteristic is described in connection with an example, a person skilled in the art may give effect to such feature, structure or characteristic in connection with other examples, whether or not explicitly set forth herein.

It will be appreciated that the methods described and the apparatus shown in the figures may be configured or embodied in machine-executable instructions; e.g., software, hardware, or in a combination of both. The instructions can be used to cause a general-purpose computer, a special-purpose processor, such as a DSP or array processor, an application specific integrated circuit (ASIC), a field programmable gate array (FPGA) or the like, that is programmed with the instructions to perform the operations described. Alternatively, the operations might be performed by specific hardware components that contain hardwired logic or firmware instructions for performing the operations described, or may be configured to do so, or by any combination of programmed computer components and custom hardware components, which may include analog circuits.

The methods may be provided, at least in part, as a computer program product that may include a machine-readable medium having stored thereon instructions which may be used to program a computer (or other electronic devices), or a FPGA, or the like, to perform the methods. For the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, or other functional equivalents. The software program product may be stored or distributed on one medium and transferred or re-stored on another medium for use.

For example, but not by way of limitation, a machine readable medium may include: read-only memory (ROM); random access memory (RAM) of all types (e.g., S-RAM, D-RAM); programmable read only memory (PROM); electronically alterable read only memory (EPROM); magnetic random access memory; magnetic disk storage media; FLASH; or, other memory type that is known or will be developed, and having broadly the same functional characteristics.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

A memory system may be comprised of a number of functional elements, and terminology may be introduced here so as to assist the reader in better understanding the concepts disclosed herein. However, the use of a specific name with respect to an aspect of the system is not intended to express a limitation on the functions to be performed by that named aspect of the system. Except as specifically mentioned herein, the allocation of the functions to specific hardware or software aspects of the system is intended for convenience in discussion, as a person of skill in the art will appreciate that the actual physical aspects and computational aspects of a system may be arranged in a variety of equivalent ways. In particular, as the progress in the electronic technologies that may be useable for such a system evolves, the sizes of individual components may decrease to the extent that more functions are performed in a particular hardware element of a system, or that the scale size of the system may be increased so as to encompass a plurality of system modules, so as to take advantage of the scalability of the system concept. All of these evolutions are intended to be encompassed by the recitations in the claims.

The memory system may comprise, for example, a RAID controller, a data switch fabric, an ordering plane fabric, memory controllers and memory modules. In a large memory system, where reliable storage of data is desired, there is always a concern that the failure of an element of hardware, an unidentified software defect or a power failure, may lead to the uncorrectable loss of data. As a consequence, data storage systems may provide for a periodic back-up of the data to a disk or tape system for archival storage. While this may permit reconstruction of data lost to a memory system failure, the response time is long as compared with the expected response time of the memory system and such "restorals" are desired to be avoided.

Consequently memory systems may be designed with both hardware and software redundancy. One of the common techniques for storing data in a redundant fashion in a memory system is RAID. The concept of RAID (Redundant Arrays of Independent (or Inexpensive) Disks) dates back at least as far as a paper written by David Patterson, Garth Gibson and Randy H. Katz in 1988. RAID allows disks memory systems to be arranged so as to protect against the loss the data that they contain by adding redundancy. In a properly configured RAID architecture, the loss of any single disk, for example, will not interfere with the ability to access or reconstruct the stored data. The Mean Time Between Failure (MTBF) of the disk array without RAID will be equal to the MTBF of an individual drive, divided by the number of drives in the array, since the loss of any disk results in a loss of data. Because of this, the MTBF of an array of disk drives would be too low for many application requirements. However, disk arrays can be made fault-tolerant by redundantly storing information in various ways.

Other areas of redundant design include the hardware for routing the data to memory storage modules, power supplies, fans, and the like. Further, it may be desirable for these components to be replaced when necessary without interfering with the operation of the memory system.

"Bus" or "link" means a signal line or a plurality of signal lines, each having one or more connection points for "transceiving" (i.e., either transmitting, receiving, or both). Each connection point may connect or couple to a transceiver (i.e., a transmitter-receiver) or one of a single transmitter or receiver circuit. A connection or coupling is provided electrically, optically, magnetically, by way of quantum entanglement or equivalents thereof. Other electrical connections, by the same or similar means are used to provide for satisfaction of such additional system requirements as power, ground, auxiliary signaling and control, or the like. Such additional connections are occasionally described so as to clarify the description, however such additional connections are well known to persons skilled in the art, and the lack of description of these connections in any example should not be taken to exclude their inclusion.

A link carries signals on a signal lines. Signals may fall generally into any of several categories including clock and control signals, address signals, command signals, and data signals. Data signals carry data that may be stored in, or retrieved from, a memory device or interface. Address signals specify the location or range of locations within a memory device or system where data is to be read from or written to, and may also select which of one or a plurality of memory devices or interfaces is to be accessed. Command signals instruct a memory device or interface as to what type of operation is to be performed, e.g., read, write, refresh, and possibly as to which of several access modes (such as a burst or broadcast mode) should be used for a data transfer. Clock and control signals may act to synchronize the other signals passing between controller and the memory devices. Although a link may use a separate signal line for each signal (e.g., 32 address lines to transfer a 32-bit-wide address in one clock cycle and 32 data lines to transfer a 32-bit-wide data word in one clock cycle), various schemes also exist to re-use one or more signal lines for different signals, various schemes also exist to re-use one or more signal lines for command signals, control signals, address signals, or data signals during different clock cycles of a memory transaction.

A memory system may be configured to operate with one or more associated servers, and such memory systems may be termed "directly attached storage" (DAS). An example of such a system is the Violin Memory 3200 FLASH memory system (available from Violin Memory, Inc, Mt. View, Calif.) which can interface with a server using, for example, a PCIe (PCIexpress) bus having one or more channels. Alternatively, the same memory system may interface with a networked environment in a Storage Area Network (SAN), or as Network Attached Storage (NAS), using a protocol converter, bridge or other technique or device. The connections between the user, the servers and the memory storage may be any of the known or subsequently developed forms of data transport including the worldwide web (WWW, Internet), Ethernet, wide or local area networks (WAN, LAN), optical networks, radio networks, or the like. Dedicated interconnections may also be used.

Large memory systems may service a plurality of individual using applications, and such applications may be independent of each other, as in virtualized systems. Alternatively, a plurality of applications may access and operate on a common memory area, such as where data has been de-duplicated, and is accessed by a plurality of users. The memory system may thus be partitioned, for example, into private (exclusive) memory areas or into shared memory areas, or any combination or variation thereof, a memory location, or range thereof, being subject to configurable access criteria. Depending on the specific needs of an application, the memory areas may be configured so as to have different reliability, access time, bandwidth and other characteristics. These characteristics may be expressed, for example as a selection of the RAID type to be employed, the striping of the data (wide or narrow, for example) and other selectable system attributes, such as the bandwidth of the port through which a server accesses the memory system. These attributes may be embodied in hardware, or configurable by an algorithm, data table, or the like.

As the address size of a memory system grows, the number or bandwidth of the access points thereto may need to increase, and consideration given to the impact of read and write loading on the access time (latency), on load balancing between the various entities (e.g., servers), and on coordinating the access to a memory location that is shared by a plurality of requesting users. Further, in any large electronic system, hardware failures occur, and an attribute of such systems may be to isolate a failure so as to affect the smallest number of users, or to permit the repair of the failure, including recovery of the associated data, while maintaining operation of the memory system, or a portion thereof.

An example computing system 1, shown in FIG. 1, may comprise a server 5, or other source of requests, such as previously described, to perform operations on a memory system 100. The most common operations to be performed are reading of data from an address in the memory system 100 for return to the server 5, or writing data provided by the server 5 to an address in the memory system 100. The data to be read or written may comprise, for example, a single address or a block of addresses, and may be described, for example, by a logical block address (LBA) and a block size.

In describing the operation of the system, only occasionally are error conditions and corner cases described herein. This is done to simplify the discussion so as not to obscure the overall concept of the system and method described herein. During the course of the system design and development of the computer program product that causes the system to perform the functions described herein, a person of skill in the art would expect to identify such potential abnormal states of operation, and would devise algorithms to detect, report and to mitigate the effects of the abnormalities. Such abnormalities may arise from hardware faults, program bugs, the loss of power, improper maintenance, or the like.

The interface between the server 5, representing the global environment external to the memory system 100, and the memory system 100 may be any of the interface types previously described, or as may be developed to perform similar functions. In an example, the interface 50 between a server 5 and the memory system 100 may be a PCIe bus having one or more bidirectional channels.

The logical address of the data may be specified in a variety of ways, depending on the architecture of the memory system 100 and the characteristics of the operating system of the server 5. The logical memory address space may be, for example, a flat memory space having a maximum value equal to the maximum number of memory locations that are being made available to the server 5 or other using device of the memory system 100. Additional memory locations may be reserved for internal use by the memory system 100. Alternative addressing schemas may be used which may include the assignment of logical unit numbers (LUN) and an address within the LUN. Such LUN addressing schemes are eventually resolvable into a specific logical address (LBA) within the overall memory system 100 address space. The address resolution may be performed within the memory system 100, in the server 5, or elsewhere. For simplicity, the descriptions herein presume that a LUN and address therein has been resolved into a logical address within a flat memory space of the memory system 100.

A computing system may use, for example, a 64-bit binary address word resulting in a theoretical byte-addressable memory space of 16 exabytes ($16 \times 2^{60}$ bytes). Legacy computing systems may employ a 32-bit binary address space and are still in use. A 64-bit address space is considered to be adequate for current needs, but should be considered to be for purposes of illustration rather than a limitation, as both smaller and larger size address words may be used. In some cases, the size of an address word may be varied for convenience at some level of a system where either a portion of the address word may be inferred, or additional attributes expressed.

The logical address value LBA may be represented in decimal, binary, octal, hexadecimal, or other notation. A choice of representation made herein is not intended to be limiting in any way, and is not intended to prescribe the internal representation of the address for purposes of processing, storage, or the like.

The type of memory being used to perform any storage function, temporary or intended to be permanent, is not intended to be limited by the specific examples being used to explain the concept of operation. Various types of memories as mentioned above, are used in computing, telecommunications and other electronic systems and may be used herein as well.

Commands and data may be received, or requested by the memory system 100 (FIG. 2) from the server 5 over the interface 50 based on the number of requests that may be accommodated in the RAID controller 10 (RC) of the memory system 100. The RC may have an input buffer 11 that may queue a plurality of commands and data that are to be executed by the memory system 100. The RAID engine 12 may de-queue commands (e.g., READ, WRITE) and any associated data from the input buffer 11 and the logical block address LBA of the location where the data is to be stored, or is stored. The RC 10 may decompose the logical block address and the block of data into a plurality of logical addresses, where the logical address of each portion of the original block of data is associated with a different storage module so that the storage locations for each of the plurality of sub-blocks thus created distributes the data over the physical storage memory 200 so that a failure of a hardware element may not result in the loss of more of the sub-blocks of data that can be corrected by the RAID approach being used. In classical simple example, using an array of disks, this would mean that each of the sub-block data blocks of a stripe (sometimes called "strips") and the parity data strip would reside on a different disk.

The RC engine 12 computes a parity over the entire block of data, and stores the parity as a strip on a storage module selected such that a failure of that storage module does not compromise the data of the data block being stored. In this manner, the parity data may be used to reconstruct the data of a failed disk. That is, the remaining sub-blocks (strips) and the parity data strip may be used to recover the data of the lost sub-block. Alternatively, if the disk on which the parity data fails, all of the sub-blocks of the block of data remain available to reconstruct the parity strip. Sub-blocks of a block of data may also be called "chunks" or "strips." A disk has been used in this example; however, a person of skill in the art would recognize that this applies to a variety of types of memory technologies and hardware configurations.

Figure 2:
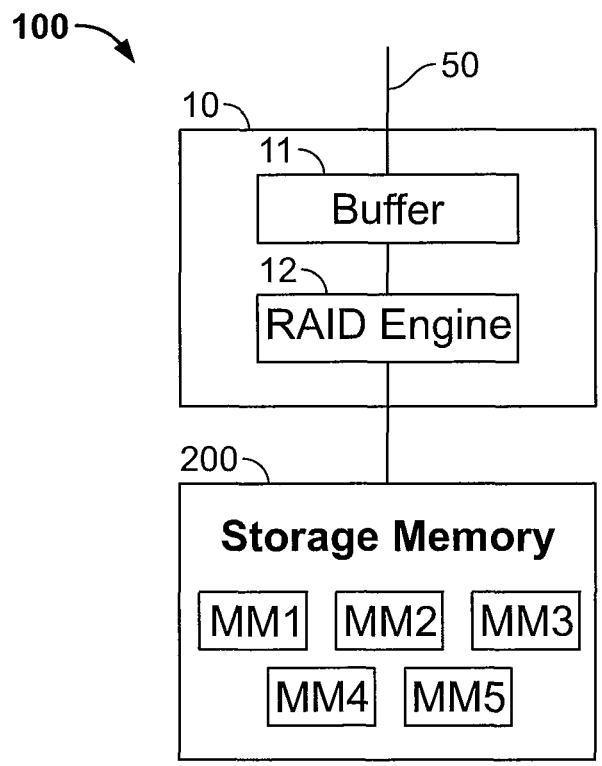
FIG. 2 shows a block diagram of a representative memory system having a RAID controller and a storage memory comprising a plurality of memory modules.

In an example, there may be 5 memory modules, as shown in FIG. 2, of which four modules may be allocated to store sub-blocks of the data block having a block address LBA and a size B. The fifth module may store the error correction data, which may be parity data, for each block of data. A group of memory modules that are used to store the data, which may include error correction data of the group or of another group may be termed a RAID group or stripe. The number of sub-blocks, error correction data strips, and the number of memory modules (MM) in the RAID group may be variable and a variety of RAID groups may be configured from a physical storage memory system, and a plurality such other configurations may exist contemporaneously. The particular example here is used for convenience and clarity of explanation.

The RAID group may be broadly striped across a large memory array, for example as described in U.S. patent application Ser. No. 12/901,224, "Memory System with Multiple Striping", which is commonly assigned and is incorporated herein by reference. Different RAID striping modalities may be interleaved in the memory address space.

The RAID controller may use the logical block address LBA, or some other variable to assign the command (READ, WRITE) to a particular RAID group (e.g., RG1) comprising a group of memory modules that are configured to be a RAID group. Particular organizations of RAID groups may be used to optimize performance aspects of the memory system for a particular user.

In an example, the logical block address may be aligned on integral 4K byte boundaries, the increment of block address may 4K and the data may be stored in a RAID group. Let us consider an example where there are up to 16 RAID groups (0-Fh), and the mapping of the logical block address to a RAID group is achieved by a simple algorithm. A logical block address may be: 0x 0000000000013000. The fourth least significant nibble (3) of the hexadecimal address may be used to identify the RAID group (from the range 0-F, equivalent to RAID groups 1-16). The most significant digits of the address word (in this case 0x000000000001) may be interpreted as a part of the logical address of the data in a RAID group (the upper most significant values of the logical address of the data on a module in a RAID group); and the last three nibbles (in this case 0x000) would be the least significant values of the logical address of the data stored in RAID group 3 (RG3). The complete logical address block address for the data in RG3 would be 0x000000000001000 (in a situation where the digit representing the RAID group is excised from the address word) for all of the MM in the RAID group to which the data (and parity data) is stored.

Figure 3:
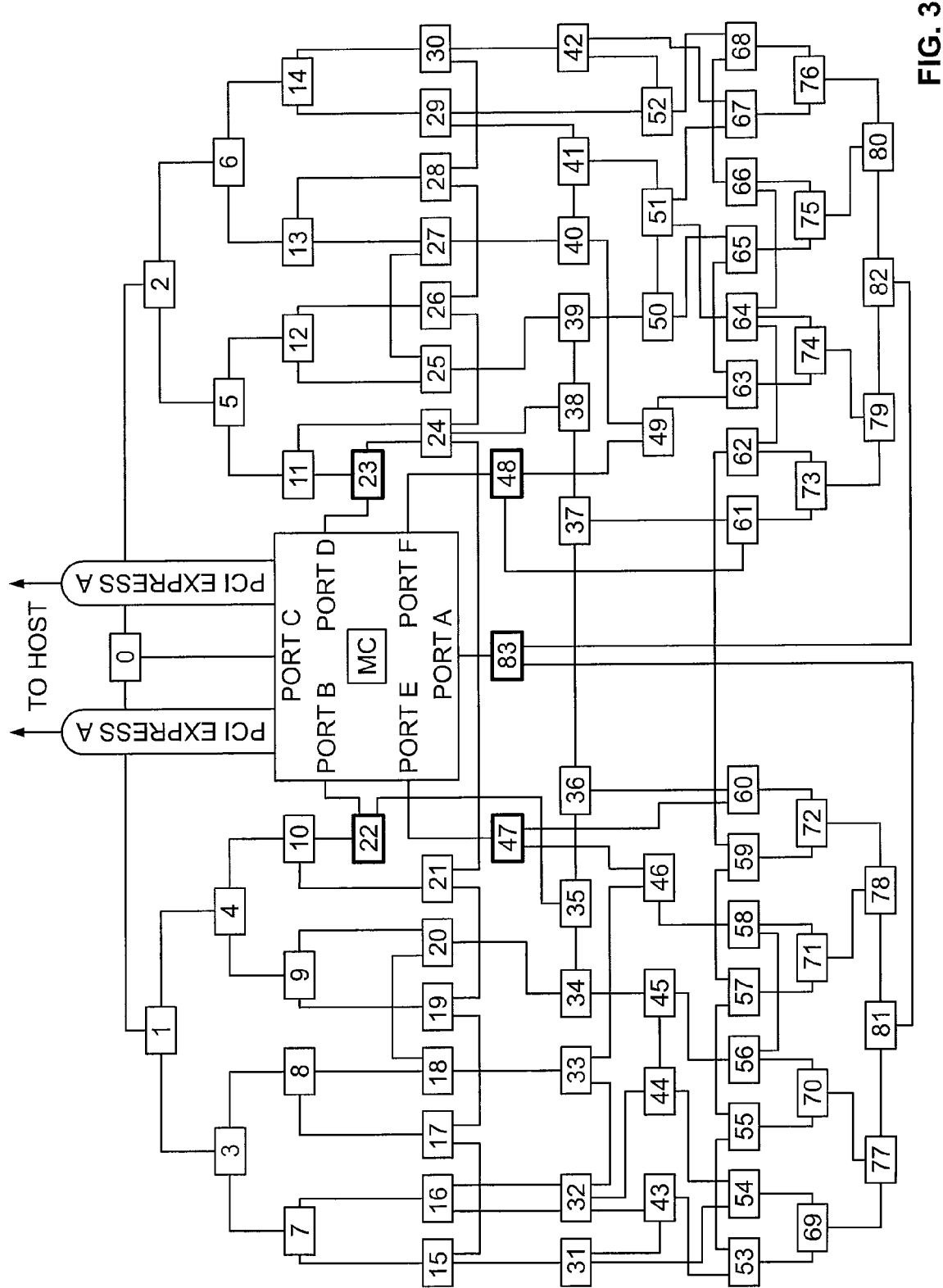
FIG. 3 shows an example storage memory where the memory modules are connected to a memory controller through a multi-rooted tree.
Figure 4:
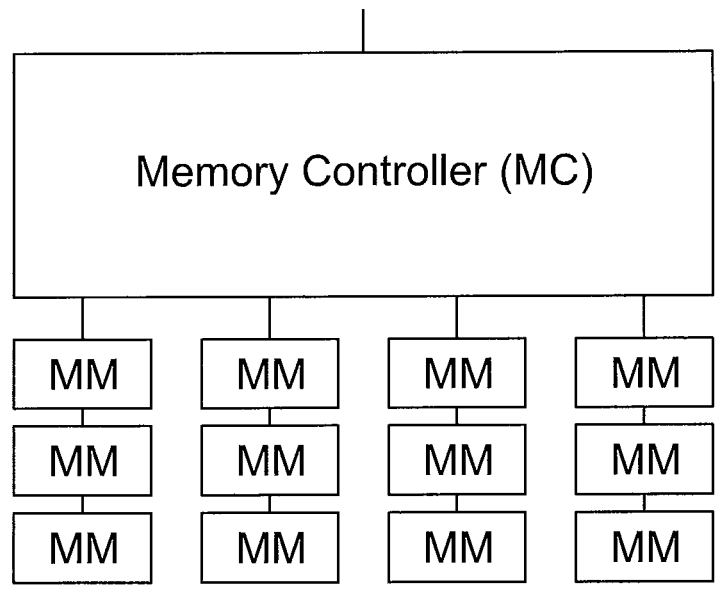
FIG. 4 shows an example storage memory where the memory modules are connected to a memory controller through a linear bus.

The routing of the commands and data (including the parity data) to the MM of the memory system 100 depends on the architecture of the memory system. Two example architectures are illustrated. FIG. 3 illustrates a tree-type architecture and FIG. 4 illustrates a plurality of linear busses.

The memory system shown in FIG. 3 comprises 84 individual memory modules connected in double ended trees and ancillary roots that are serviced by memory controllers to form a "forest". Memory modules MM0 and MM83 may be considered as root modules for a pair of double-ended binary trees. Memory modules MM1, MM2, MM81 and MM82 may be considered to be root memory modules of individual trees in the memory. The MC, and memory modules MM22, MM23, MM47 and MM48 may act as root modules for portions of the memory system tree so as to provide further connectivity in the event of a memory module failure, or for load balancing.

The memory controller MC may connect to the remainder of the memory system 100 by one or more PCIe channels. Moreover, the memory controller itself may be comprised of a plurality of memory controllers for redundancy purposes.

The individual memory modules MM, or portions thereof, may be assigned to different RAID groups (RG).

TABLE 1

| RAID Group | C0 | C1 | C2 | C3 | P |
|---|---|---|---|---|---|
| 0 | | | | | |
| 1 | | | | | |
| 2 | | | | | |
| 3 | MM23 | MM1 | MM16 | MM17 | MM20 |
| 4 | | | | | |
| . | | | | | |
| . | | | | | |
| . | | | | | |
| 15 | | | | | |

For clarity, only the memory modules currently assigned to one RAID group (RG3) are shown in Table 1. As there are 16 RAID groups in this example, each associated with 5 MMs, a total of 80 MMs would be associated with the currently configured RAID groups. Since the tree of FIG. 3 may accommodate 84 MM, this can permit up to 4 MM to be allocated as spare modules, immediately available should a MM fail.

Table 1 provides the basis for the configuration of a routing table so that a routing indicator can be established between any particular port (labeled A-F in FIG. 3) of the memory controller MC and the destination module MM for a sub-block of block of data, or the parity thereof, to be stored at an address in the selected RG.

The routing indicator is used to determine the path from the MC to the individual MM. The routing may be determined, for example, at the memory controller MC and the routing executed by switches in the MMs along the path as described in Ser. No. 11/405,083, "Interconnection System", which is commonly assigned and is incorporated herein by reference.

Other approaches can also be used to cause the commands and data to be forwarded form the MC to the appropriate MMs.

Each memory module MM may store the data in a physical address related to the logical block address. The relationship between the logical block address (LBA) and the physical address depends, for example, on the type of physical memory used and the architecture of memory system and subsystems, such as the memory modules. The relationship may be expressed as an algorithm or by metadata. Where the memory type is NAND FLASH, for example, the relationship between the logical address and the physical address may be mediated by a flash translation layer (FTL). The FTL provides a correspondence between the data logical block address LBA and the actual physical address PA within the FLASH chip where the data is stored. The FTL may account, for example, for such artifacts in FLASH memory as bad blocks, and for the physical address changes of stored data associated with garbage collection and wear leveling, which are desired to be accommodated while the memory system is operating.

In the present example of operation, a 4K byte data block is separated into 4 1K chunks, and a parity P computed over the 4 chunks. The parity P may be used for RAID reconstruction or may also be used for implementing "erase hiding" in a FLASH memory system, as described in a U.S. patent application Ser. No. 12/079,364, "Memory Management System and Method", which is commonly assigned and is incorporated herein by reference. When the data is received at the destination MM, the logical block address LBA is interpreted so as to store or retrieve the data from the physical memory. Since the chunks stored in the MM of a RG have an ordered address relationship to the data block of which they are a constituent, the storage of the chunk on a MM may be adequately described by the base logical block address of the data block.

Returning to FIGS. 1 and 2, consider a path for a data write or read command that is received over the interface 50 from the server 5. The RAID controller RC 10 determines the appropriate RG of the memory 200 that will be accessed, and routes the same command (and any associated data payload) to the memory 200. The routing may be through a switch fabric in a networked storage environment, or directly to the memory 100. If the command is consistently routed from the server 5 to the memory, the commands would be received in order by the memory 200. Similarly, if the commands were consistently routed to the various storage locations in the memory 200, such as by the routing table (Table 1) used in the memory of FIG. 3, the commands would be received in order at each MM. At each memory module, the commands may be put in a queue and executed in order. In such an instance, an earlier pending write command to a group of particular write addresses would be executed prior to a later read command for the same group of addresses, and the data that would be read by the read command represents the most current data at that memory location, where the group of addresses represents, for example, a RAID group.

However, the speed of operations performed at a MM depends on such factors as the overall read or write throughput for each MM, possible write or erase time blockages in a FLASH memory, or disk access latency in a conventional disk system. So, while the sequence of operations at each MM, considered separately, may be ordered, this situation may not obtain when a plurality of MMs is considered, as in a RAID group and where the memory system 100 has more than single input port. This could lead to reading data of a RG where all of the sub-blocks are not current. That is to say, one of the sub-blocks of data or the error correction data that is read may not be part of the current data block. This is particularly a concern where a cache of current data is maintained at the MM and there may be no provision for locking the address for reading until all previously pending writes to that address have been executed.

Since RAID systems are normally intended to reconstruct data only when there is a failure of one of the hardware module, each of the data sub-blocks that is returned without an error message would be treated as valid. However some of the sub-blocks may be out of date, depending on the operations recently performed on one or more of the MM. This situation may normally be overcome by maintaining a queue of requests at a location in the system such that pending writes to a LBA are performed in order and that a pending read to the LBA is performed after all previous writes to that LBA have been performed. Situations such as this arise sporadically during the course of operation of the memory system, but may occur frequently if the LBA is being frequently addressed by write commands. The consequences are sufficiently serious that the situation cannot be overlooked. But, maintaining such a queue may constitute a bottleneck in the system.

Figure 5:
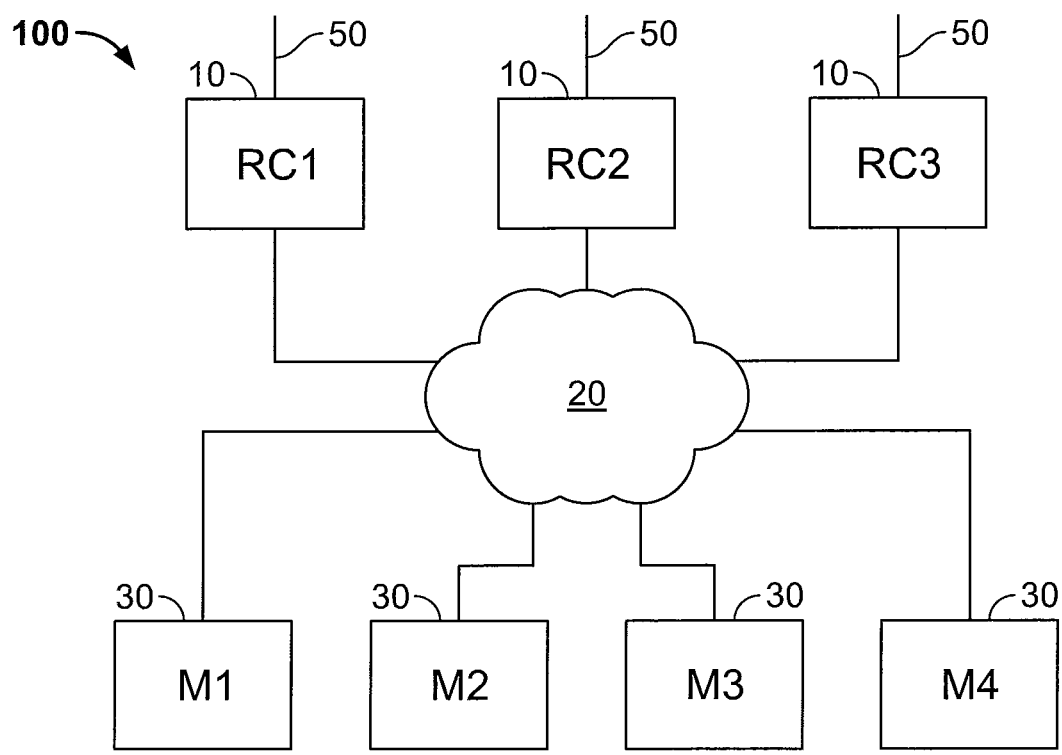
FIG. 5 shows an example storage system wherein a plurality of RAID controllers are in communication with a plurality of storage memory units through a communications medium.

Consider a memory system such as shown in FIG. 5 where a plurality of RAID controllers (RC) 10 and memory arrays 30 are interconnected. Each of the memory arrays M may be, for example, the memory array shown in FIG. 3 or FIG. 4. This architecture may be used for a number of purposes, including increasing the redundancy of data storage, reducing the latency of data retrieval, load leveling, or the like. The RAID controllers 10 may communicate with each of the memory arrays M (30) through a plurality of point-to-point links, or a switch fabric 20, which may be any suitable technique such as an array of PCIe switches, an Ethernet, Fiber Channel, or any other existing or to be developed technique for providing such connectivity. Typically, the connectivity may be designed and constructed to provide redundant connectivity between each of the RC and each of the memory arrays 30.

The memory system 1 may interface with servers, with another network, or with a combination of such sources and destinations of data using switches, bridges or other equipment and techniques so as to respond to read requests or write requests, or other functional commands, or where the write requests may include a payload of data to be stored.

A RAID controller, such as RC1, receiving commands through external interface 50, may operate on the logical block address (LBA) of the request so as to convert the address into an association of chunks of data of the data block request with destinations in the memory system (for example a MM). Taking an example where the block is divided into 4 equal sized chunks and a parity computed over the block to provide the fifth chunk, the individual chunks may be assigned to memory modules in any of the memory arrays 30 in accordance with a policy. Where the data is RAIDed data, the policy may include not storing any two chunks of the data block or parity data in a same module (MM) of a memory system. The extent of the physical memory data area that is considered to be a module of the memory may depend on the organization of the memory, the failure modalities expected, the level of data reliability needed for a particular user, or other performance attributes. In a large memory system, servicing a plurality of user tasks, the criteria may differ for each of the user tasks. Consequently the definition of a module may range from a die, to a package, to a field replaceable device, to a memory array, to a group of memory arrays, or the like.

Thus, the term "module" has a meaning that is context dependent. Here the meaning is that the level of partitioning the system is governed by the desire to only store as many of the sub-blocks (chunks) of data of a data block on a particular hardware element as can be corrected by the RAID approach chosen, in the case where the "module" has failed. In other contexts, which may be within the same memory system, a module may have a different meaning. For example, when the concept of "erase hiding" is being used, the module may represent that portion of memory that is schedule for a write or an erase period of operation. There may be more than one "erase hiding" module in a module defined for RAID. That this is reasonable may be understood by considering that a memory module, such as is used in FIG. 3 for example, may have a switch, processor and cache memory on each module, as well as bus interfaces, and that a failure of one or more of these may render the memory module inoperative. However, for the purposes of managing write or erase time windows, the memory chips on the memory module may be controlled in smaller groups.

In a situation where a RAID controller, such as RC1 is configured to store all of the sub-blocks of a data block with a specified LBA in one of the memory arrays (e.g., M1) of the memory system 100, once the RAID group and the parity are computed, the request may be dispatched to the memory array (M1).

Figure 6:
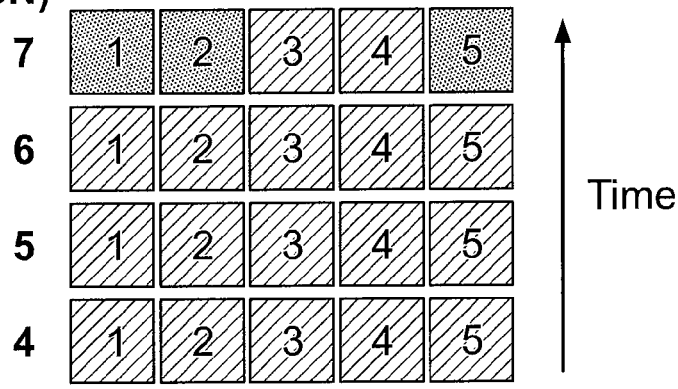
FIG. 6 is a representation of a buffer area of a RAID controller, where the data has been formed into strips, including a parity strip, and assigned a local sequence number (LSN); the acknowledgment status of the strips by the receiving memory module is shown.

FIG. 6 illustrates a buffer memory in RC1 at given epoch. Each of 4 data blocks (4-7) has been converted into chunks with a fifth chunk representing the parity P over the other 4 chunks. Each data block has been assigned a local sequence number (LSN) in the order that the command was received at the interface 50, or dequeued from the buffer memory 11 of a server 5. The command, which may include an associated data payload, may be transmitted to the memory array M1 through the switch fabric 20, so long as the memory controller of the memory array M1 has the capacity to accept data. The data transmission protocol may include acknowledgement of safe receipt of the data packets by the memory array M1. As shown, the data of data blocks having LSN of 4-6 has already been acknowledged by the destination memory array M1. Only two of the chunks of LSN 7 have been acknowledged by M1.

Another of the RAID controllers (e.g., RC2) may receive data through an interface 50, and the data may subject to a different RAID protocol. For example the chunks of data associated with a data block may be stored, in part, in M1 and in part in M2. These data chunks, having been processed by RC2 will have a LSN assigned by RC2 which will generally be different than that of the current data being received from RC1 by the M1, and the amount of data processed by each RC will depend on the specific commands being received from the external environment. The LSN assigned by RC2 may be greater, less than or the same as that assigned by RC1. The task of managing the input data buffer of MC of M1 is complicated by these differing LSNs, yet there is a benefit in dispatching the group of chunks of that have been generated by the processing of a command by a RC as soon as practical, so as to minimize the amount of data stored in an output buffer of the RC. This applies as well to the time delay in dispatching the data from the input buffer, which may contribute to system latency.

A global sequence number (GSN) is a parameter having a value that is monotonically incremented and thus a GSN is a unique identifier of the command or data object with which it has been associated. The word size of the GSN is selected to be sufficient such that roll-over of the value does not occur within at least the lifetime of an unfulfilled command. For simplicity, the size of the GSN may be considered to be a 64-bit binary word. In some circumstances, the lower order bits of the GSN may be used for compactness.

The GSN number space may be associated with GSN domains, which may be useful for limiting the number of RAID controllers associated with range of GSNs function, while permitting the RAID controllers of different groups of RAID controllers to access common physical memory controllers or memory modules. Each domain has a number space and a domain designation, such that the domains are identifiable and may be managed in accordance with a protocol, which may, for example, govern the priority of execution of commands.

In another aspect, multiple domains of GSNs may fully or partially overlap such that a group of RAID controllers may process commands and perform different functions with controllable attributes, such as the priority of the operations.

Figure 7:
FIG. 7 is a representation of a buffer area of another RAID controller where a different data chink has been assigned a LSN local to the another RAID controller.

Consider the situation illustrated in FIG. 7 where the output data buffer of RC3 is shown. Only a single command is present, and all of the chunks have been acknowledged. This leads to the situation shown in FIG. 7 for the data chunks in MC1. All of the chunks of the data block having local serial number 27 at RC3 have been acknowledged by whichever of the memory arrays M to which each of them has been sent.

At this juncture, a Global Sequence Number (GSN) may be assigned to each group of fully acknowledged chunks comprising a data block and parity. This may be communicated to all of the memory arrays (M) by sending a tuple (RC#, LSN#, GSN#) to each of the memory arrays (M1-M4) so that unique GSNs (in this case 2001 and 2003) are associated with the chunks of a block, wherever the chunks currently reside. At this time, local sequence number LSN7 of RC1 is not as yet eligible to be associated with a GSN as all of the sub-blocks have not as yet been acknowledged (see FIG. 6). Apparently there are no chunks of data associated with GSN 2002 that are intended to be stored in M1.

Figure 8:
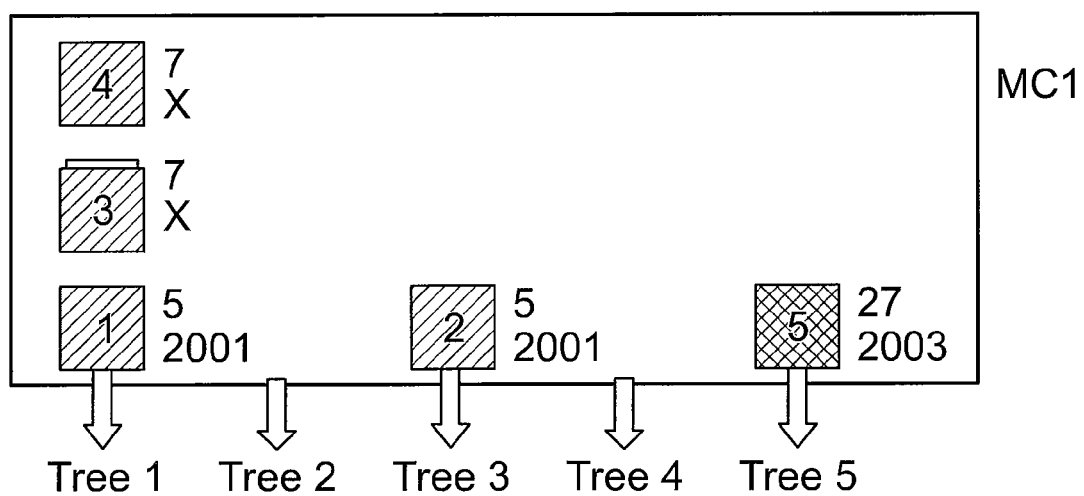
FIG. 8 is an representation of a buffer area of memory controller showing data received from a plurality of RAID controllers, where some of the data, having been acknowledged by all of the destination memory controllers, has be assigned a global sequence number (GSN), while other data awaits the assignment of the GSN.

Immediately prior to the epoch illustrated in FIG. 8, a situation existed where sub-blocks 1 and 2 had been received from RC1 a sub-block having a LSN 5 and sub-block 5 having a LSN of 27 had been received from RC3; sub-blocks 3 and 4 having a LSN of 7 have also been received from RC1. These sub-blocks represent data from different original blocks, having different logical block addresses, and seemingly different RAID group processing. The data sub-blocks have been shown where some of the data blocks have already been assigned a global sequence number (GSN). In this example, local sequence number 5, received from RC1, was assigned GSN 2001 and corresponds to sub-blocks 1 and 2. Local sequence number 27 received from RC3 was assigned GSN 2003 and corresponds to sub-block 5. For a GSN to have been assigned, all of the sub-blocks of (RC1, LSN 5) would have to have been acknowledged to RC1, regardless of which memory array M they had been sent to. As the remaining sub-blocks (3-5) of LSN5 are not present at MC1, they would need to have been present in one of the other Ms and have also been acknowledged to RC1 by the appropriate memory controller MC. The presence of an assigned GSN is indicative of the situation that all of the sub-blocks of the block have been loaded to an appropriate memory controller MC and been acknowledged to the sending RC. The same conclusion applies to (RC3, 27). The remaining sub-blocks (1-4) of this block have evidently been downloaded to other memories M and have been acknowledged to RC3.

So the presence of a GSN associated with a sub-block in a MC is indicative that the remainder of the block is present in at least one other MC and that the same GSN has also been associated with the remaining sub-blocks of the data block. Hence, the identification of the sub-blocks of data with the original block of data received by a RC from the external environment is maintained, even though the sub-blocks have been dispersed across the memory system 200. Moreover, the process of assignment of the GSN is a way of releasing the sub-block data into a storage memory of a memory M, when all of the sub-blocks allocated to the MC for a particular input data block have been received and where the further processing may proceed independently of the other memories M of the memory system 200.

Conversely, sub-blocks 3 and 4, received from RC1 with LSN 7 have not as yet been assigned a GSN. This may be a consequence of RC1 not having received an acknowledgement of receipt of the remaining sub-blocks from another MC (e.g., MC2) to which they have been directed. It may be that more of the sub-blocks of LSN7 are intended to be sent to MC1, but have not as yet arrived. Alternatively, sub-blocks may all be destined to other MCs, but not as yet acknowledged to RC1.

So, when a GSN has been assigned to data in the MC, this act also indicates that all of the sub-block data associated with the original data block that is to be processed by the MC has been received by the MC. As the GSN is assigned in accordance with a protocol, which will be subsequently described, there may be a short time interval where all of the sub-blocks of the block have been acknowledged, but the GSN has not as yet been either assigned or received by the MC.

In accordance with the status of the sub-blocks shown in FIG. 8, sub-blocks 1 and 2 having GSN 2001 can be executed by transmitting the associated commands on memory trees 1 and 3 of M1. The next lowest GSN in MC1 is GSN 2003 associated with sub-block 5 which may be transmitted on tree 5. However, sub-blocks 3 and 4 associated with LSN7 of RC1 do not have an associated GSN and are retained in the output queue of MC1. At a future time, when either more of the sub-blocks associated with (RC1, LSN7) have been received by MC1 or by other MCs, and all of the sub-blocks acknowledged by the MCs to RC1, a GSN would be assigned and, when it is assigned, providing that it is the lowest GSN in the MC queue, the data may be transmitted on the designated tree (in this case tree 1). During the interval that the sub-blocks reside in the input buffer of MC1, for example, the LBA of the sub-blocks and the position of the sub-block in the RAID group may be used as previously described to look up or compute the routing indicator, so that this operation may be subsumed in the process for allocating GSNs.

In this example, the sub-blocks may have been allocated to the memories M by each of the RCs using an algorithm acting on the LBA to determine a RAID group number and type, and the chunks of the RAIDed data block are allocated to the memory arrays based on a striping policy. Once the chunks of data are received by a MC of an M, the LBA and the RAID group number may be used to determine the routing to a storage memory module MM, similarly to that described in Table I.

The GSN may be assigned using a variety of approaches so as to provide a unique serialization of each data block received by the memory system 100, without regard to the external connection through which it was received.

Figure 9:
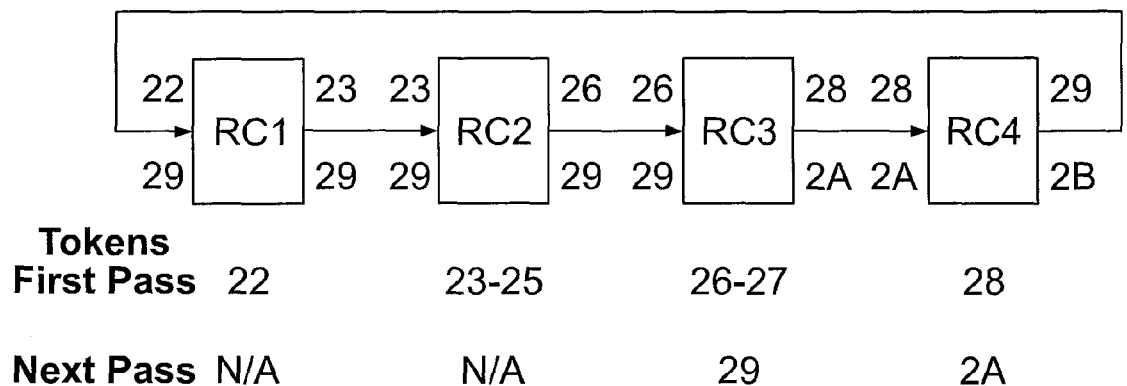
FIG. 9 shows an arrangement of the RAID controllers in a round-robin configuration for the assignment of a GSN to data acknowledged by the memory controllers.

In a first approach to assigning the GSN, shown in FIG. 9, a token passing approach is used. That is, a message (token) is sent sequentially from one RC to another so as to execute a ring or round-robin path. In this manner, during the round-robin time, each of the RCs may have the opportunity to acquire a quantity of GSNs that correspond to the number of data blocks that have been dispatched from the RC to the memory arrays M since the last time that the token was possessed by the RC, and have been fully acknowledged to the dispatching RC. The token may be passed using the switch fabric 20, or by another communication path, which could be, for example, an Ethernet or point-to-point links depending of the latency desired.

In this example, starting at RC1, where the present maximum GSN value is 22 at the time that the token is received, and RC1 has two blocks fully dispatched to the memory arrays and acknowledged, GSNs 23 and 24 are allocated and the token value appropriately incremented to 24 and transmitted to RC2. At RC2, there are three completed data blocks. Three GSNs are needed and allocated, and the token value incremented to 27. At RC3, the initial value of the token is 27, but here are no pending GSN requirements at RC3, so the token value is unchanged and passed to RC4. At RC4, there are 6 GSNs needed and GSNs 28-33 are allocated and the token value incremented to 33. At this point the token is passed to RC1 to begin the process anew, with a token value of 33. Thus, depending on the amount of data being processed by each of the RCs, the token value is incremented to reflect the change in the GSN appropriate for the number of completed data blocks.

Once a GSN is allocated to a completed data block, a tuple may be formed comprising the (RC#, LSN#, GSN#) and transmitted to a memory array M. Where the system is configured so that sub-blocks of the data block (for simplicity, the parity sub-block is presumed to be subject to the same process) may be dispatched to different memory arrays (M1-M4) the tuple may be transmitted to all of the memory arrays M and the association of the tuple with the already resident sub-data blocks results in assigning the GSN to sub-data blocks regardless of the memory array M in which it resides. Where the tuple is sent to each of the memory arrays, the global sequence number sequence is continuous, regardless of whether there are sub-blocks in the input buffer of the M for which assignment of any particular GSN is appropriate. So, should there be some jitter, or delay in the receipt of a GSN tuple, the situation will be evident as a gap in the GSN sequence. Such a gap may not be very lengthy (assuming that this is not a failure mode), and the missing GSN will soon be received. Once a continuous sequence of GSNs is present, the GSNs may be associated with the sub-blocks as previously described and the sub-blocks processed by the individual memory arrays M. This results in the chunks of data of the RAIDed data being sent to the memory modules MM of each memory array in the same sequence at each memory array M, even though there may not be chunks of data of a RAID group being stored in all of the memory arrays M.

Since a memory array M may be organized or controlled so that more than one chunk of data of a RAIDed data block can be stored on the memory modules MM of the array M (such as RC1, LSN7 in MC1), there may be situations, where all of the chunks of a data block are dispatched to a single MM of a group of memories M. Similarly, where there are at least as many memories M as there were are chunks in a RAID group (including the parity chunk) a situation may arise where each chunk has been dispatched to a different M. In another aspect, there may be situations where none of the chunks of a data block are stored in a particular memory array M. These situations may exist simultaneously or contemporaneously depending on the characteristics desired of a LUN, for example.

As memory speed requirements continue to increase, the delays associated with propagation of the token may introduce a latency that is excessive with respect to the design requirements. Moreover, the completed and acknowledged sub-block transferred data in each MC of the M may need to be temporarily stored, and this may introduce a need for additional high-speed memory circuits. An objective of some designs may be to maintain a processing speed of the data at the line speed of the data incoming to the memory system 100 for as much of the data path as is feasible. This may be achieved to some extent by parallel processing, and may avoid buffering and head-of-the-line blockages in the architecture.

Another approach to performing the assignment of the GSNs may be to use a separate communications path for the acknowledgements from the memory arrays M to the RAID controllers RC, and a similar separate path for transmitting the GSN-LSN assignment tuples to the memory arrays.

Figure 10:
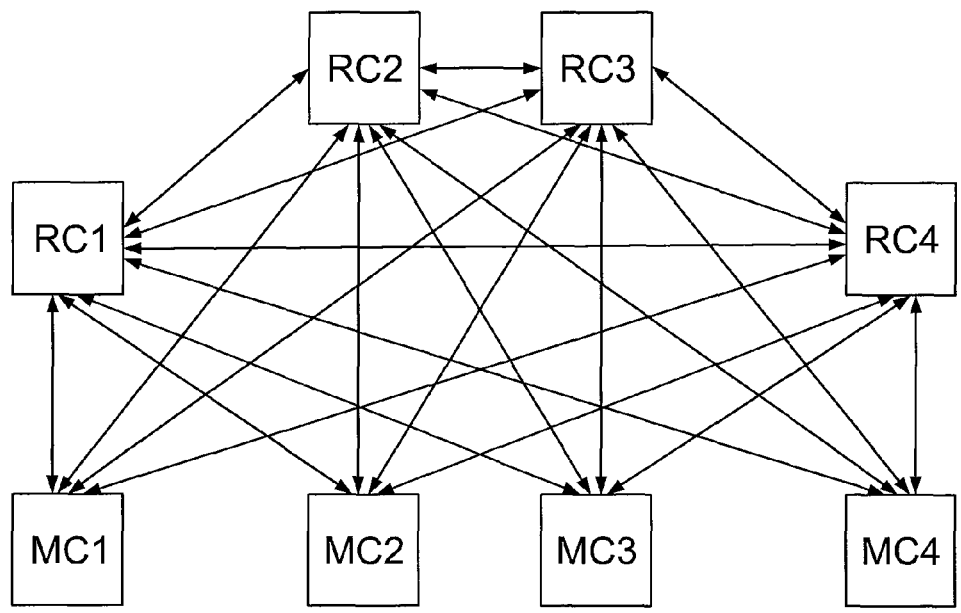
FIG. 10 shows an arrangement of the RAID controllers in a star configuration (ordering plane) for the assignment of a GSN to data acknowledged by the memory controllers.

In addition to the connectivity between the devices afforded by the switch fabric 20, another communications network may be used. This may be an "ordering plane 70." This "ordering plane" may be realized as a switch fabric, similar to the switch fabric 20, and may be any of the known or subsequently developed hardware and techniques for routing data between modules of a system. A separate PCIe switch network may be used, so as to achieve acceptable latencies. Alternatively, as shown in FIG. 10, a plurality of high-speed point-to-point data links may be provided so that the RCs and the MMs may communicate with each other. The serial links may be LVDS (Low Voltage Differential Signaling) or SERDES (Serializer/Deserializer), optical links, or the like, as are now known or as may be later developed.

The communications between the modules may be, for example, in the form of a round robin with a token being passed, as previously described or as a time-synchronized schema, where the token passing is implicit and the individual RCs and MMs may perform the desired functions effectively in parallel. As with the round-robin approach to assigning GSNs, the chunks sent by the RC to one or more of the memory modules M are acknowledged to the sending RC. The acknowledgment may be for a single chunk or for a plurality of chunks sent during an interval of time. That is, the chunks may be sent to the M in bursts and a single acknowledgment of receipt made.

Figure 11:
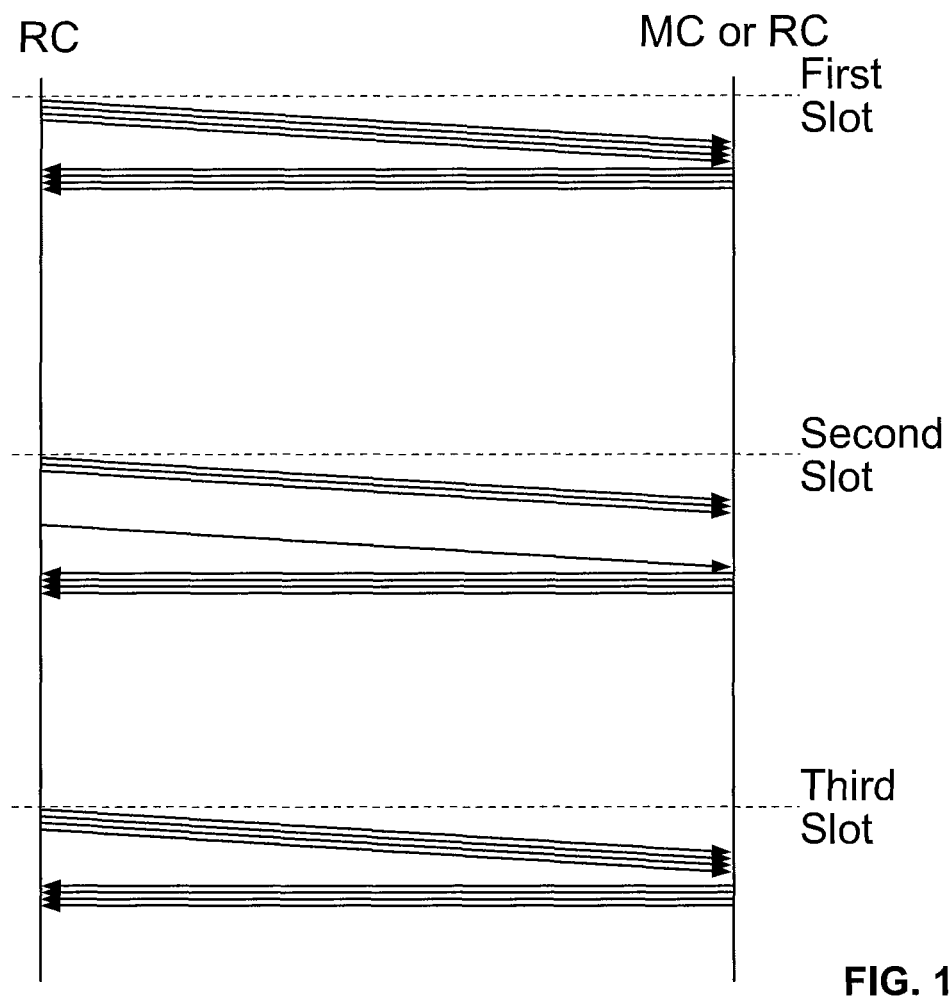
FIG. 11 is a timing diagram showing the communications between RAID controllers and the memory controllers where at time-slotted protocol is used on the ordering plane.

Communications between the RCs and the memory modules M may be ordered in a number of ways, or may be managed by a collision-detection or other protocol. In an example, the RCs may be configured to transmit their messages over the ordering plane 70 at a periodic rate, time of transmission referenced to an initializing epoch, or controlled by a common clock. FIG. 11 schematically shows an arrangement where each of the RCs is configured to transmit any messages regarding assignment of a GSN every T microseconds with respect to an origination epoch. Each of the RCs transmits a message to each of the other RCs, and as the contents of the message may be the same, the message may be sent as a plurality of point-to-point messages or as a multicast message.

Each RC receives messages from all of the other RCs, and when all expected messages are received, or a time out occurs, the RCs independently act on the contents of the messages in accordance with a predetermined protocol, algorithm, or the like, so as to autonomously assign a GSN to data that each RC has already transmitted to the individual memory modules M. In the example shown in Table II, each of the RCs is assigned a virtual place in the round robin. Each of the RCs sends a message, which may be a broadcast message, to all of the other RCs in the domain, the message including a request for sufficient GSNs to assign a GSN to each of the data blocks that have been stored as chunks that have been stored in the MC of memory arrays M and have been acknowledged to the RC.

TABLE II

| 0... | 1... | 2... | 3 | Virtual Sequence Number (VSN) |
|------|------|------|------|-------------------------------|
| RC1  | RC2  | RC3  | RC4  | RAID Controller Number        |
| 0    | 2    | 3    | 1    | Number of GSNs requested      |
| 27   | 101  | 5000 | 40   | Current Local Sequence Number (LSN) |
| N    | N+2  | N+5  | N+6  | Equivalent Token Number       |

The chunk may represent, for example, either a write command and have an associated data payload that is to be written to a logical address in the memory array M to which it has been sent, or a read command, which may have an administrative payload, LBA, other commands such as a SYNC, a NOP, TRIM, a hybrid command such as a compare and write, or no payload. In the case of a read command, a data payload may not be needed. Rather, the command is interpreted by the memory array to locate data and read data associated with the logical block address LBA provided, and to return the data to the requesting RC.

So, the individual RCs each may have a different number of read commands or write commands that have been acknowledged by or dispatched and acknowledged by the memory arrays M or since the last time the last time a GSN allocation request message has been sent.

Consider a configuration of four RCs and a plurality of memory arrays M. These may be considered to represent the domain of validity of the GSN to be allocated. When the GSN allocation request messages have been received from each of the RCs at the other RCs, the state of knowledge at each of the RCs is shown in Table II. Each of the RCs has knowledge of the number of GSNs requested by the other RCs. Let us allocate, for example, a virtual sequence number to each of the RCs, acting as a fictive position in a logical round robin configuration. In this example, RC1 has requested 0 GSNs, RC2 has requested 2 GSNs, RC3 has requested 3 GSNs and RC4 has requested 1 GSN. So, proceeding through the assignment of GSNs, the GSN range at RC1 has not changed, while that of RC2 would comprise N+1 and N+2; the GSN range at RC3 would comprise N+3, N+4 and N+5; and the GSN range at RC4 would comprise N+6. So, if N were the GSN at the beginning of the execution of the algorithm, the global value of the GSN would now be N+6 and this value could have been computed by any one of the RCs, since all of the data needed to compute the GSNs was present at each of the RCs. At the time that the next GSN allocation request message is sent by the RCs, the starting value of GSN would be N+6.

Each of the RCs may also have a local sequence number counter (LSN) and the LSN counter may be used in forming the tuple previously described. So each of the newly assigned GSNs may be associated with a LSN at the RC, and when the tuple is received at each memory array M, the GSN can be associated with the appropriate chunk.

The periodicity of sending GSN allocation requests is a matter of system design and may be selected and configured based on specific system requirements. In an example, a period of 2 μs may be chosen, however a wide range of intervals may be used. Each of the RCs may dispatch a GSN assignment message to some or all of the memories M containing the tuples that have been computed for the prior interval. When these tuples have been received by the memory arrays, they may be acknowledged to the RCs. When a RC has had all of the messages acknowledged, an execute command may be sent to the appropriate memories M so that the chunks that have now been associated with GSNs and reside in the memories M may be processed to perform the indicated functions. This execution message may be sent with the subsequent tuple message, so that the memories M receive the execution command at substantially the same time. However, depending on the system design, the execute message may be dispatched asynchronously.

FIG. 11 shows a timing diagram where the GSN assignment tuples are sent to the memories in a burst, and the acknowledgements are returned. Other schemes for assigning GSNs may be used, including using one of the RCs as a master, or a separate device as a master.

After the completion of the operations shown in FIG. 11, the status of the chunks may be similar to that previously shown in FIG. 8. From the viewpoint of sequencing of the original input data, an input data block has been converted into a plurality of chunks, each chunk being destined for a different memory location in a plurality of RAIDed memories M. After having been distributed to the memories M, the chunks were given a GSN that is consistent across all of the memory arrays M, and placed in a queue for storage in the memories M in locations associated with the logical block address LBA of the input data block. As shown, the chunks may not all be in the same memory M, and the memories each may be operating while experiencing differing operational loading depending on the commands and data being processed for a plurality of servers, users, or the like, so that the overall operation of the global memory may not be exactly synchronized. Yet, at this juncture, the next operation in each of the memories M are being executed on the commands or data having the same GSNs to within about the periodicity of assignment of GSNs and all of the data blocks in the memory controllers of the memory arrays M having the same LBA also have the same GSN.

One may view this state at a particular level in a memory hierarchy. For example, in the situation where the memory array is a DRAM module that is a part of an Intel FBDIMM memory, the data would be written to the address range of the memory attached to a root of the memory controller MC of the memory array M, where in this case M is M1-M4.

However, the memory array may have a more complex architecture, and the memory technology may be disk, FLASH, or other memories that are being developed, and which may have indirect addressing schemes and other operational constraints.

As shown in FIG. 8, the chunks have been queued for several of a plurality of memory bus roots in the individual memory M. This allocation is made in accordance with a configuration table, such as Table II, that associates the logical block address LBA with a memory module MM or memory area within the memory array. The memory bus roots may terminate a linear bus, a circular bus, a binary bus, or the like.

In another aspect, the GSN may be allocated in accordance with a method and protocol such as described above; however, the GSN may be assigned to the same command used for the plurality of logical addresses of the strips of a RAID stripe while the data of the stripe is at the RAID controller. The commands and data are sent to the memory controllers and executed in GSN order at the memory controllers. Here the command and data of the RAID stripe are temporarily retained in storage at the RAID controller until the GSN has been assigned. In the previous example the command and data may be dispatched to the memory controller at the line rate, without storage. The presence of gaps in a GSN sequence at a memory controller may be accommodated by service messages, GSN NOPs, or the like.

In another aspect, GSNs may be assigned so as to group commands and any associated data for uninterrupted sequential execution. For example, two 4 KB chunks of data that are intended to be written as an 8 KB chunk may be assigned sequential GSNs. Thus, higher order control of the sequence of execution of commands may be exercised while maintaining the overall command control protocol.

In yet another aspect, the GSN may be used to facilitate recovery from an unexpected event such as data error, software crash or module failure, for example. Until the data has been reliably committed to the non-volatile memory the data may be temporarily stored in a memory at the RAID controller. The GSN assigned to the command may be associated with the temporarily stored data. In an aspect, the GSN assignments may be stored in a buffer so as to be aligned with the temporarily stored data and be replayed along with the temporarily stored data so as to perform the association only when a replay is required.

The temporarily stored data may be mirrored to another of the RAID controllers so as to provide redundancy in the event of the failure of a RAID controller.

Each memory module MM may be a destination for data from one or more using entities, such as servers, and each server may support multiple instances of a program or programs, each of which may write or read data from an address range on the memory module. So, data from a plurality of RCs may end up being written or read to any individual memory module. In addition, in some bus systems, such as the binary tree bus of the Violin Memory Model 3200, there may be a plurality of data paths between the memory controller MC of the memory M and the destination memory module MM.

Data that is dispatched in time order may arrive out of time order. Also, since data is being stored on a plurality of memory modules MM, there may not exist an unbroken series of GSNs received at any single MM. It may be desirable to determine whether the data received in a buffer at the MM represent the sequence of GSNs sent to the memory module MM. That is, are the gaps in the sequence of received GSNs at the MM the result of data being sent to MMs other than the destination memory module, or is there data in the gap of GSN sequence numbers that has been sent, but has not as yet been received. Such a determination may be useful in performing a number of the functions of the memory module MM.

Accordingly, in an aspect, a local sequence number MMLSN is maintained in the MC of a memory array M such that a continuous serialization of the chunks sent by the MC to each MM is maintained. When received at the MM, the MMLSN is unique to the MM, as only data destined for the MM is acted upon by the MM. Data intended for other MMs as a destination may pass through the target MM, however, the data may not be acted upon or stored.

Figure 12:
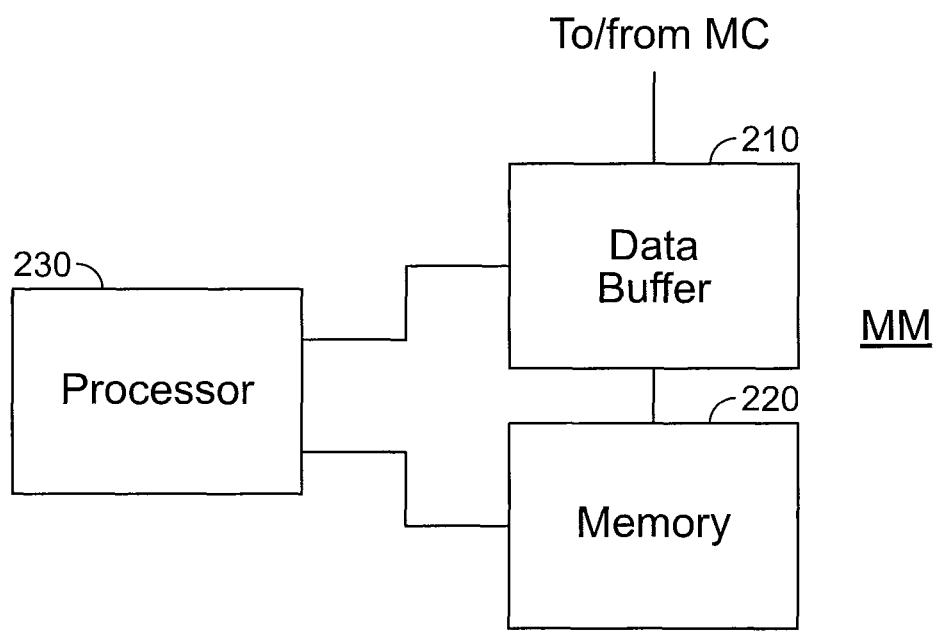
FIG. 12 is a block diagram of a representative memory module.

FIG. 12 shows a block diagram a portion of a MM. that receives, processes, stores and retrieves data from memory locations that are local to the MM. Other functions of the MM, which may relate to routing commands and data to other memory modules, to erase hiding, and to housekeeping operations are not addressed, except for some specific aspects thereof.

Typically a MM may have a volatile high-speed buffer memory 210, which may be, for example, SRAM, DRAM or another memory type having similar characteristics. Buffer memory 210 may be used to receive and process commands and data routed to the MM by the MC. The commands and data may be temporarily stored in buffer memory 210 and may be further processed by local processor 230 prior to storage in the storage memory 220. The storage memory 220 may be any of the memory types previously discussed. However, in the present example, the storage memory 220 may be FLASH memory. The characteristics of presently available FLASH memory are well known to persons of skill in the art. Some information on these characteristics and the system implications thereof may be found in U.S. patent application Ser. Nos. 12/079,364, "Memory Management System and Method" and 12/796,836, Memory System Having Persistent Garbage Collection", which are incorporated herein by reference.

NAND FLASH memory is presently available in two configurations: single level cell (SLC); and multi-level cell (MLC). The functional difference may be said to be the number of bits of data may be stored in a particular addressable memory location. SLC stores one bit per cell while MLC stores two bits per cell. Cells capable of storing more than two bits per cell are being developed, and may be used when commercially available.

A characteristic of FLASH memory is that the speed of reading stored data is greater than the speed with which data can be stored. This asymmetry in reading and writing times, as well as the characteristic that a block of memory cells must be erased before a memory cell therein may be written to again, have a significant influence on memory system design. Designs exist so as to mask the writing or erasing times in performing RAIDed operations, and to perform housekeeping operations in a relatively continuous fashion so as to mitigate the asymmetrical write/read characteristics of the memory circuits.

A person of skill in the art would understand that a block of memory cells and a block of data are not necessarily synonymous. NAND FLASH memory, as is currently available is comprised of semiconductor chips organized as blocks of memory that are subdivided into pages, and the pages may be subdivided into sectors. Generally a block of memory is written on a sequential basis with a minimum writable address extent of a sector or a page of the memory, and generally the sector or page may not be modified in place (with changed data) unless the entire block of pages of the memory is erased. However, a block of data can also represent an aspect of a data structure and is more properly thought of as a logical construct. A block of data may have an extent that is greater than a page of memory or a block of memory.

To accommodate the situation where the logical address of a data element does not generally simply correspond to the physical address in the memory where the corresponding data may be found, a intermediary protocol, generically called a Flash Translation Layer (FTL) may be implemented, so that metadata provides for a mapping of the logical data address to the physical data address, while also accommodating needed housekeeping operations.

Some or all of the storage memory 220 of the MM may be prevented ("blocked") from reading data in response to a READ request, as the memory chip may be performing a erase or write operation at the time that a READ request is received. Where a large number of READ or WRITE requests are pending at a MM, congestion may occur.

The MM may receive commands or data from one or more roots of a tree of a memory array, and each of the commands may have a GSN where the GSN is globally unique. The sequence of GSNs received at a MM may not be unbroken, and may not be received in exact order. A broken sequence occurs when successive commands (READ or WRITE) are sent to different MMs by the MC of the memory M. This is necessary to use the other memory modules MM for the storage of data. The out-of-sequence arrival may result from the data being sent to the MM from the MC over different physical paths. Alternative paths may have been used for load leveling in the bus or MC, or routing around a failed memory module MM in a tree.

Certain operations may be facilitated at the MM providing that the out-of-order reception can be ascertained and corrected in the queue of operations to be performed by the MM, and that breaks in the GSN sequence can be identified so that the operations in the local queue are in monotonic GSN order (including the recognition of gaps).

In an aspect, a MMLSN counter for each addressable MM may be maintained in the MC. Each command (and by implication any payload data) may be assigned a unique (to the MM) MMLSN by the MC, where the MMLSN i is a continuous integer number sequence. There are as many MMLSNs maintained in the MC as there are addressable MMs in the memory array to which the MC can be connected by the bus architecture. The MMLSN associated with a MM is assigned to data having a destination in a specific MM, regardless of the tree root or routing that is used to access the MM.

In an aspect, a tuple is formed having at least the GSN of the command and the most current MMLSN of the MM. This command and associated tuple is for the next data package to be sent to the MM by the MC.

FIG. 13 shows a conceptual situation in the buffer memory 210 of a memory module MM. Shown are a plurality of commands (some of which, being write commands, are associated with a data payload). The tuples associated with the commands are characterized by an expected monotonically increasing value of MMLSN and GSN. The GSN sequence may be a broken sequence as explained previously. That is, the sequence may have gaps. However, the MMLSN sequence is continuous and expected to be monotonic in accordance with a rule for assigning MMLSNs in the MC that has previously been described.

In particular, in this example, one notes that GSN 3102 appears to be missing, and MMLSNs 23 and 22 are out of sequence. Taking account of the rules articulated above, the ordering of the commands in the buffer memory 210 is adjusted, with the result shown in FIG. 16. That GSN 3102 was not intended for execution by the destination memory module MM has been recognized (and could have been recognized as early as the receipt of MMLSN 19). Moreover, the out of order receipt of GSNs 3106 and 3107 has been recognized, and the sequencing has been corrected.

Operating the memory module MM in accordance with the received data sequence shown in FIG. 13 may result in out-of-order execution of the commands, and possible return of incorrect data, while waiting to resolve the apparent gaps in the GSN may cause congestion in the MM. The example shows only small gaps in the GSN; but, in a large memory array, where a particular MM is not very active, the time between receipt of successive commands may be large compared with the data processing capability of the MM. Certainty regarding the presence of gaps in the GSN and in the proper ordering of the commands may permit operations to be performed at the MM without confirming the gap, as well as prevent out-of-date data errors.

In this example, the lowest numerical value of MMLSN is executed first. That is, the list is unloaded from the top and filled from the bottom. When the list of FIG. 14 is executed, for example, there is no need to wait between the execution of GSN 3101 and 3103, as the MMLSN shows that there is no gap in the actual sequence of data that has been received. The MM is thus not waiting for a delayed command associated with an intermediate value of GSN. GSNs 3106 and 3107 are executed in the correct order. The read from LBA3 is performed before the write to LBA3. If these operations had been performed in the reverse order (that is, as received in FIG. 13) the write operation would have been performed prior to the read operation, which is out of order, and data that was originally present would no longer be correct, as it would have been overwritten by the data just written to LBA3. The use of the term "overwritten" here is in a figurative sense that the data at LBA3 will have been changed by the write operation. Typically, in NAND FLASH, this would have been accomplished by writing the data to a new physical address in the memory and updating the metadata of the FTL. However, the result is that the data read out of sequence would be incorrect.

In the situation shown in FIG. 13, there appears to be a gap in the GSN between 3106 and 3117, and without the use of the MMLSN to identify that this is not a gap but an out-of-order receipt of data, other means of determining the situation would have been necessary. This might have been performed by acknowledgement of receipt of the GSN by responding to the MC, analogous to a non-posted transaction. However, this would have to be generally done for all of the received GSNs or at least for all gaps in the GSNs. During that latency period the data would need to be retained in the buffer memory 210 and at least some of the local data processing deferred until the sequence gap is resolved.

Commands that are known to be in order, with consistent GSNs (including recognition of gaps), may be executed immediately, or further processed so as to optimize the use of the resources of the MM.

The method of processing the commands received at the MM described above permits certain efficiencies and optimizations to be effected, depending on the specific system design; however, other methods may be used.

For example, a situation may arise where a large number of write commands are dispatched to a specific LBA. In a straightforward approach, the individual write commands would be executed sequentially, so that each successive write command would commit the data payload to the storage memory 220. Where this memory is FLASH memory, each write operation would be to a sequential sector or page of a previously erased memory block, so that the number of pages used would be equal to the number of times the specific LBA was written.

However, if the data has been ordered for execution in the manner shown by FIG. 14 and the next received command were characterized by the tuple (24, 3109) WRITE, LBA3+ data, such a command could be processed immediately if it were the lowest MMLSN still in the list, as the gap in GSNs would not be a concern. If the circumstance is that the remaining commands in the list were as shown as in FIG. 16, and GSN 3107 had not as yet been processed, one may ascertain that the operation associated with GSN 3107 has been overtaken by events. That is, the data in LBA3 will be overwritten by new data associated with GSN 3109, and there is no intervening READ operation pending for LBA3. Storing the data in LBA3 associated with GSN 3107, and then immediately "overwriting" it with new data would be a waste of system resources.

In another aspect, consider the subsequent receipt of a command characterized by (25, 3277) READ, LBA3. Now, there are no GSNs expected between 3107 and 3277 as the previous MMLSN was 24, and the MMLSN also indicates that the request is in sequential order. Consequently, the pending commands in the list may be inspected to see if there is any reason that the READ command cannot be executed immediately (subject to other constraints, such as erasing, or writing to the chip)

If there are no requests for reading data from LBA3 having lower GSNs, and no pending write request to that LBA, the data presently in LBA3 is timely data for this request. The command may be further processed and the results returned to the memory controller MC. A place marker is kept until the read is completed so that a subsequent write command is not executed too early.

Other efficiencies may be possible. For example, if the executing read command is still in the list when another read command for the same LBA (in this case LBA3) is received, and there are no intervening write commands, the data subject to the first read command remains timely for the second read command, and may be returned to the MC to satisfy the second read request as soon as the first read command has been completed. The data that has been read in accordance with the first read command may also be present in a cache in the buffer memory 210 and, subject to the same rules, it may be used in lieu of actually performing the read operation on the storage memory 220.

The results of a read operation on a LBA of MM are returned to the MC expeditiously via the system bus. As each read result is associated with a MM and the GSN, and the GSN for all of the chunks of a RAIDed data block is the same, when the data chunks returned to the originally issuing RC, the data block may be reassembled. Depending on whether "erase hiding" are employed, or not, the first N−1 (where there is one parity chunk) of the N chunks received may be reconstruct the data block, or the system may wait until the N−1 chunks received are the chunks that do not include the parity chunk. The reconstructed data is then returned to the requesting entity, as is known in the art.

Consider the throughput of a system using at least portions of the concepts previously described. The analysis is considerably simplified for the purpose of visualizing the loading on various aspects of the system.

For a direct attached storage (DAS) scenario, the memory system 200 would be requested to perform to service the demands of the using server 5. Assume a combined input demand comprising 1 million operations per second, divide approximately between read operations and write operations, each write operation comprising a 4K byte data payload. For simplicity, we will assume that each request (read or write) comprises about 50 bytes of information (source address, destination address, etc,).

So, the commands represent an input data flow rate of about 25 MB/s, and the data to be written comprises an input data flow rate of about 2.5 GB/s. For scaling purposes, for a direct attached storage scenario, the 2.525 GB/s data input rate could be theoretically supported by a PCIe x12 interface with a composite bandwidth of 3 GB/s. However, to be compatible with the example of FIG. 5, consider a server being attached to the system 100 by four PCIe x4 interfaces, having a composite bandwidth of 4 GB/s, communication the four RAID controllers RC.

Each RC processes an average of 250K requests per second, and will be assigning GSNs to each of the requests, whether the request is a read request or a write request. Configured in a four RC and for memory array M system with a 2 μs period between assignments of GSNs, approximately 0.5 GSN would be needed for allocation by each RC during a GSN assignment period. Each of the RCs decomposes the 4K data block into four 1K blocks, as previously described, and computes a parity P over the blocks. This creates 5 data chunks. As we have seen, it is reasonable to distribute the chunks such that three memory arrays M receive one chunk and the fourth memory array receives two chunks. By configuring the system 1 so that the chunks are distributed evenly amongst the memory arrays, the data processing load on a memory M is approximately 0.5 chunks per assignment period.

Each of the memory arrays has a memory controller MC that communicates with the switch fabric 20, the ordering plane 70 and the roots of the associated memory bus. In the situation described here there are 6 roots (FIG. 3).

Since each of the MC communicates with a RC and receives approximately 0.5 chunks of data per ordering period from each RC, the total number of chunks of data received by a MC per ordering period is about 2. But, whenever all of the chunks of a RAIDed data block are acknowledged to the issuing RC, a GSN is assigned and sent to the MCs so that the chunks may be dispatched by a MC to the memory modules MM of the memory M.

Roughly then, the equivalent of a RAID group of chunks has been distributed to the memory M about every 4 μs. A memory M may be comprised of a plurality of MM communicating with the MC over a bus. Again, for estimation purposes, assume that the requests have been equally distributed over the MMs of the memory M, and that there are about 14 MMs associated with each of the 6 roots serviced by the MC. Four or five chunks of data are dispatched by the MC every 4 μs. But each root transmits only one of the chunks, and that chunk is destined to one of the ten modules serviced by the root. So, each MM may receive an average of one data request per 4 μs. This is the equivalent of a composite read/write rate of about 25,000 operations per second.

Until this point in the system hierarchy, the data processing and communication may be handled at at least about the average line rate, and little in the way of buffering of data may be required. When the commands and data are received at the MM, congestion may occur, and the capability of the MM to accommodate such an operations rate may determinative as to the overall throughput of the system 1.

At the MM, if the memory technology is FLASH, erase times may be of the order to 10 s of ms, and write times may be of the order of several milliseconds. Each of these times may increase, rather than decrease, as manufacturers may trade the number of bits per cell against the time to program or write data to a cell. Read operations are relatively speedy as compared with write/erase operations and are perhaps 250 μs for commercially available components today. Improvements in access bus architecture may further reduce the read time. Depending on the organization of the memory chips on a MM, and the operation of the MM, the gap between the performance of individual memory chips and the desired performance of the MM may be mitigated. In particular, the erase/write hiding technology previously described could be used at the MM level, considering the MM as a memory array. Here, the data may be further RAIDed, for the purpose of write/erase hiding. Such techniques may be used in addition to the methods of eliminating redundant reads or writes as described herein.

The system and method described herein may be controlled and operated by a software program product, the product being stored on a non-volatile machine-readable medium. The software product may be partitioned so as to be resident in the RC, MC, MM and elsewhere so as to cooperatively implement all of part of the functionality described. The computing devices may be a combination of diverse processing devices with internal or external memory for program and data storage, and may include ASICs (application specific integrated circuits), FPGAs (field programmable gate arrays), microcontrollers, microprocessors, CPUs (central processing units) or the like, as are known or may be developed. Such computing elements may be configured as parallel processors, hardware-based encoders, protocol converters and other functional elements of the system.

The preceding description used a data block of 4 KB for illustrative purposes. While it appears that many new designs of data processing systems are using this block size, both larger and smaller block sizes may be used. A system optimized for 4 KB data blocks may be configured to that operate with legacy systems using block sizes of, for example, 128 bytes, which may be of the size order of a cache line. Page sizes of 256, 512, 1024 and 2048 bytes may also be used, and will be recognized as previously used in disk systems, for example. The smallest writable page size of currently available mass market FLASH is 512 bytes, and writes of less than 512 bytes may either be padded with a constant value, or shared with other small data blocks. When the data block is read, even if a larger data block is read from the FLASH, the desired data may be extracted from the output buffer of the device. When servicing the sub-optimum block sizes, the number of read and write operations may be increased relative to the example described above.

The level of the system and sequence of performing the various methods described herein may be altered depending on the performance requirements of a specific design and is not intended to be limited by the description of specific illustrative examples.

Inevitably, during the lifetime of a complex system, failures or anomalies occur which may involve the recovery, reconstruction, or relocation of data that has been previously stored. Where the operation is performed so as to overcome a loss of data due to the failure, for example, of a page, block, die, memory package, or a memory array, the process may be termed RAID reconstruction. The specific identification of a hardware element as the cause of the failure or other need for RAID reconstruction is for convenience only in simplifying the discussion herein.

As has been described, a plurality of blocks of data representing the data and parity information associated with a RAIDed data block may be distributed to a plurality of storage modules and a same global sequence number GSN assigned to each of the plurality of data blocks after the data blocks have been confirmed to have been received by the storage modules. Further, a plurality of RAID controllers may simultaneously or contemporaneously access the storage modules while performing a coordinated assignment of the GSNs. After a common GSN has been assigned to the data blocks (here data block includes the computed parity block and any other information regarding the blocks that may be stored in the storage modules), the individual storage modules may process the data blocks for storage independently of the other storage modules.

Since an operation to store the data blocks may be conceptualized as a WRITE command accompanied by a data block as a payload, any similar command on the blocks of a RAID group, such as a READ command may be globally coordinated in the same manner. When the data that is read is returned to the requesting RAID controller, the GSN may be used to assemble the data blocks read from separate storage modules into a RAID group, for further processing or to return the data to the requesting entity.

The overall ordering of operations associated with the concept of allocating the GSN after the data blocks or commands for an operation on the data blocks of the RAID group have been received by a plurality of storage modules may be used to facilitate the rebuilding of a RAID group after a memory failure, or for the migration of data from an existing module to a new or spare module.

Figures 15, 16:
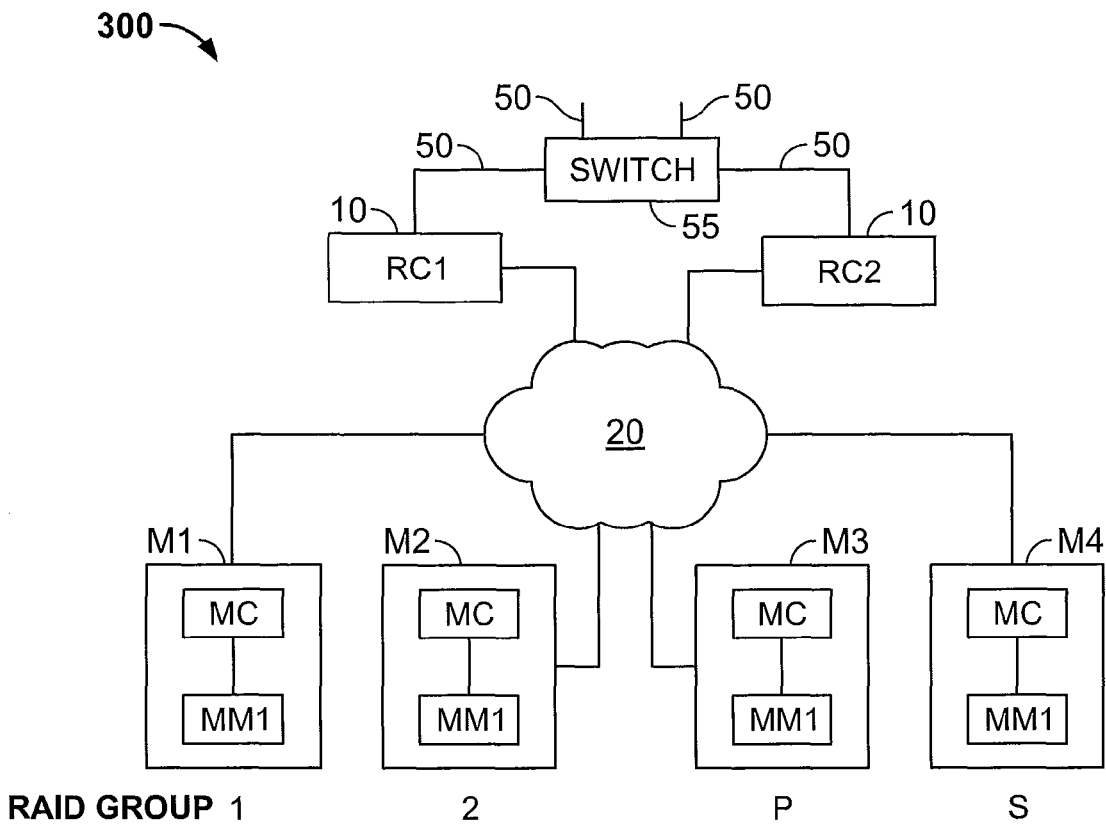
FIG. 15 shows an example of the memory system where an input switch or network is used to provide for redundant operation of the RAID controllers.
FIG. 16 shows the contents of a memory module data buffer where various operations cam be reordered or performed without access to the FLASH memory.

FIG. 15 is a simplified block diagram of a redundant RAID system that may be helpful in understanding the processes associated with RAID reconstruction or data migration.

A redundant switch 55 may be disposed between the external environment and a plurality of RAID controllers RC, so that the failure of a single RC does not result in failure of the system 300. Either of the RCs may fail, but the other RC may continue to service the external environment by routing the requests to the remaining RC. Providing that the hardware is designed and configured for "hot swapping", the failed RC may be replaced and full system operation restored. In the present example, where there are only two RCs, a reduction in system throughput may be experienced if the system is heavily loaded. However, systems with a plurality of RCs will have a reduction in performance approximately equal to the inverse of the number of RCs over which the operating load can be distributed. Similarly, the effect of the failure of a memory M may be similarly mitigated in a memory system with a larger number of memories M than shown in this example.

The failure of a memory M to respond appropriately may be due to the failure of any one of a component of the memory circuit, the associated memory controller, or some other ancillary component, including a switch of a redundant memory fabric 20, a software error, or the like. For simplicity, we presume for this example that an entire storage memory (e.g. M1) has failed. In this circumstance, the data expected from M1 will not be received, and there may be a diagnostic message that reports the failure. There are a variety of techniques for identifying a failed storage memory M, and they will ordinarily be dependent on the system technology and configuration. By whatever means that a failure is identified, corrective action will need to be taken.

In the short term, the remaining storage memory having data (M2) and the parity data from the storage module M3 may be used to reconstruct the lost data from M1. This permits the memory system 300 to continue operating at essentially full capacity. However, such a partial failure should not be permitted to continue indefinitely, as a subsequent failure of either M2 or M3 would result in irretrievable loss of data. (Of course, many systems have an archiving process to minimize or eliminate such data loss, but the restoral process is normally an off-line process and time consuming. The term data loss may be understood therefore to be a temporary or permanent syndrome.)

Providing that there is a spare storage module S, shown here as M4, the RAIDed data may be recovered and written to the spare module S. In effect, the LBAs mapped to M1 are now mapped to M4. The data for the corresponding LBAs on M2 and M3 (data block and parity) is used to reconstruct the data lost by the failure of M1, and the recovered data is written to the LBA on M4.

But, there is a possibility that the data stored in the RAID stripe may lose coherence during the process. Consider the situation where there are multiple users of the memory system 300, and more than one user is able to access the LBA being rebuilt. This may occur, for example, where the memory is being used to serve web pages, or other data, including images, data base tables, or the like, that is used in common by a plurality of using programs or entities.

During the time period after the valid data has been read from M2 and M3, and before the reconstructed data has been written to M4, one of the users may have issued a WRITE command. In this instance, if the WRITE command is executed prior to the completion of the data recovery operation, data may be written to the RAID stripe of M2, M3, M4. This would be considered as more current data than the data being reconstructed. Yet, the reconstructed data may be subsequently written to M4. This data represents stale data, so that the reconstructed data that is being stored in M4 is not consistent with the data in M2 and the parity information in M3. A subsequent failure, or the use of the parity data in effecting "erase hiding" will result in corrupted data.

One can perform operations such as locking the LBA to prevent writing during this operation so as to ensure that the rebuilding operation is performed as an atomic operation. This would be performed at the RAID controller RC. However, where there are a plurality of RAID controllers, as shown in FIG. 15, each of the RCs having the capability to access the RAID stripe being rebuilt needs to be locked for that LBA so as to ensure that there are no intervening operations.

In addition, a separate processor may be dedicated to rebuilding the RAID group, and the locking of the LBA or range of LBA being rebuilt would require coordination with all of the RCs.

In order to rebuild a LBA, data from the remaining LBAs in the RAID stripe are read and used to reconstruct the data associated with the lost block of the RAID stripe. The lost block may be a data block or a parity block. Again, one should recognize that this is a simple example so that the concept may be better understood. More complex RAID arrangements are usable with these concepts, including error correcting schemes capable of accommodating the loss of more than one segment of data of the RAID stripe, or the striping of the data of a RAID group over a large number of modules.

When the remaining data of a RAID group is read to reconstruct the lost portion of the RAID group, the operations needs to be effectively atomic. As mentioned before, the LBA of the RAID group member that has been lost is now assigned to a spare storage module. When this is done, there is no data yet stored in the spare storage module, and a READ request to the LBA would return invalid information. So, the metadata associated with the LBA on the spare storage module may be initialized with a flag that either indicates that the new location of the LBA is associated with a RAID stripe that is being rebuilt, or that no data is returned. The RAID controller would be then configured to act accordingly and to rebuild the RAIDed data as has been described elsewhere. At such time as the RAIDed group has been rebuilt, and the lost data has been restored to the spare memory module, the metadata may be modified so as to permit the data to be read in accordance with a READ command, unless such a read command has been otherwise blocked.

The place where the recovered data was stored has been described as a spare storage module, however, the location may be any memory location that is available for the writing of data. The choice of storage location for recovered data depends on the overall system design, the provisioning of spare or expansion memory, and the percentage of memory allocated to user data. These configurations may be alterable during the operation of the memory system to accommodate failures, processing loads, or the like.

The LBAs may be reconstructed individually or as a group. The size of the group and whether the group of LBAs is contiguous or constitutes some pattern of addresses may be configurable, depending on the detailed design of the system.

When an LBA is being reconstructed, a special READ command may be issued by the system component controlling the rebuilding. This may a RC or a dedicated system element. The READ command (READ-reconstruct) is issued a GSN as previously described, so as to ensure that all of the READ-reconstruct commands are executed on the LBA at each of the storage modules in an atomic fashion. That is, there are no intervening READ or WRITE commands executed with respect to the LBA on any of the storage modules being addressed.

In an aspect, when the reconstruction is being performed on a NAND FLASH storage array, for example, the actual relationship between the LBA and the physical storage location is mediated by the Flash Translation Layer (FTL). However, for purposes of simplicity of presentation, this one-to-one mapping of a logical and a physical address is presumed to have been understood by a person of skill in the art.

The READ-rebuild command is received at the modules that are currently mapped for the RAID stripe of the LBA being rebuilt. Referring to FIG. 16, let us presume that the failed memory is M1, and that the block of the RAID stripe originally on M1 is not re-mapped to M4. So the READ-reconstruct command is assigned a GSN by the RC, as previously described, and dispatched to M2, M3, M4. Valid data exists for M2 and M3, while M4 will be the storage location for the reconstructed data of the block of the RAID stripe that was lost.

The READ-reconstruct command results in reading of the data at the corresponding LBA on M2 and M3, and returning the data to the requesting RC. Whether M4 returns an indication that the data is not valid, is dependent on the specific system design. The READ-reconstruct command is not removed from the head of the queue for operation on the specified LBA in each of the memories M2 and M3. As such the READ-reconstruct command blocks further access to the LBA for writing purposes. Subsequent WRITE commands to the LBA may be queued for later execution. Subsequent conventional READ commands may be either executed based on cashed data, or on the actual LBA, providing that there is no intervening WRITE command. A READ command may be executed on a cashed pending WRITE operation under certain circumstances. Allowable cached operations are structured so as to preserve atomicity.

Thus, when a READ-reconstruct command is received by the storage modules having either the valid data for the LBA or the destination storage module for the reconstructed data of the LBA, that specific LBA on each of the storage modules is prevented from being written to until such time as the READ-reconstruct command is cleared. The READ-reconstruct command is cleared by WRITE-reconstruct command or similar command with same global sequence number (GSN) as the READ-reconstruct command. Other similar command systems which involve setting a flag and clearing a flag so as to perform this purpose will also be suitable.

When the initial READ-reconstruct command is received at each of the storage modules, the data (if any) at the LBA address is read and returned to the RC or RAID reconstruction controller, and the data is used to reconstruct the data that was lost due to the failure. When a GSN is assigned to the WRITE-reconstruct command, it may be convenient to use the same GSN as was used for the READ-reconstruct command. As such, the GSN of the WRITE-reconstruct command will be lower than that of any conventional WRITE command that was addressed to the LBA being reconstructed.

At the individual storage modules, the WRITE-reconstruct command will be the next WRITE command executed with respect to the LBA on the module so as to execute before any other WRITE commands to the LBA that were received in the interval between the execution of the READ-reconstruct command and the receipt of the WRITE-reconstruct command to the LBA.

The READ-reconstruct command blocking any queued WRITE commands may be cleared, and any pending write operations performed in sequence order. As will be discussed, depending on the sequence of pending READ and WRITE commands, some of the commands may be consolidated or dismissed as being redundant. The first pending WRITE command is the lowest GSN of the queued commands and. As such, the reconstructed data is the first data written to the LBA of each storage module. Should the metadata for the LBA of a storage module indicate that the LBA contains valid data, then the WRITE command need not be performed. Only the storage module where the reconstructed data is being stored need actually be written.

At the completion of this sequence of operations, reconstructed data has been written to the LBA M4, while the data for the same LBA (but different component of the RAID stripe) on memories M2 and M3, which remained valid, may be left in place. The RAID stripe has been reconstructed and may be used as it was before the failure.

The sequence of operations described, or a similar approach, maintains the integrity of the data stripe, while simplifying the coordination required between storage modules and the RC during the reconstruction process. Depending on the details of the system design, a group of LBAs corresponding to part or all of the failed hardware may be read and reconstructed as a batch process.

FIG. 16 illustrates a queue of commands that may develop for a LBA on a storage module during a time period between the reading of the LBA data for the purposes of reconstructing the RAID stripe, and the completion of that operation, and during the period before the queue has been clear by executing, dismissing or consolidating the commands.

Each command is stored in a queue, which may be maintained by any of the usual computer operational techniques. Here, the queue is conceptually shown as the individual commands as received and stacked in a silo, filled from the top and unloaded from the bottom. Most, but not all, of the commands will tend to be found in ascending order of GSN, as the commands may be received in approximately time order. A READ-r command is shown at the bottom of the silo, and blocks any reading or writing to the LBA until such time as it is released. As shown, the situation is when a WRITE-r command having the same GSN as a previous READ-r command is received. This GSN is necessarily lower than any of the other pending commands, and will be executed first, regardless of when it is received. After checking the metadata for the LBA on the storage module to determine whether the data payload of the WRITE-r command needs to be written to the memory, or dismissed as being a duplicate of existing valid data, the READ-r command is released, so that pending operations may occur. The pending operations (GSN 100 (write), 223, 260, 272, 315, 450 and 511) may now be performed in order, so that the data being stored or read is consistent across all of the storage modules having data for the RAID stripe.

One may also process the queue at the time that the READ-r block is removed so as to eliminate redundant operations. Generally, the data payloads of the write commands will be held in a local memory, which may be, for example, DRAM. The READ command with a GSN of 260 could be satisfied by the data payload of the WRITE command with a GSN of 223, as it will have been performed on the LBA memory prior to performing the READ command with a GSN of 260 on the memory, and the data that will be returned is that associated with having performed WRITE-223. Similarly READ-272 will also return the same data, so that both of the pending READ commands may be executed without reference to the actual physical FLASH memory. Since they will have returned valid data, with corresponding GSNs to the requesting RC, the READ commands will have been satisfied and the commands may be deleted from the queue.

As shown two write commands WRITE-100 and WRITE-315 are the no longer interleaved with any READ commands (as READ-260 and READ-272 were performed using the cached data and deleted from the queue). But READ-450 is disposed between WRITE-511 and WRITE-315. So long as the protocol for transferring the commands from the RAID controller to the queue is organized so that a missing command would have been identified, when there are no missing intervening commands, further simplifications are possible.

As WRITE-315 will overwrite WRITE-223 prior to execution of a subsequent READ command (in this case, READ-450), WRITE-223 may now be reported as having been performed, and deleted from the queue, since the data would have been stale prior to being read. READ-450 will have read the data of WRITE-315 in due course, so reading that data now from the DRAM will return the correct data. Thus a READ command may be executed even though the actual access to the physical FLASH memory may be blocked during the RAID reconstruction.

Appropriately dispositioning the pending READ and WRITE operations directed to an LBA being reconstructed may reduce the system overhead associated with the reconstruction operation by subsuming pending operations in the reconstruction period based on analyzing the queue of pending operations, and using any dynamic buffer memory that is available.

One expects that, in the fullness of time, a storage module may need to be replaced due to wear out, or to upgrade the storage capacity, speed or other attribute of the system. To do this, the data on a storage module (which may be a memory module, a storage array, or the like) may need to be migrated to a new or spare storage device in bulk, so that the entire memory module is removable. In the following discussion, one should recognize that systems may have ancillary data not addressable by the user (that is, not in any user LBA space). However, this data is addressable in some form, and if the data needs to be migrated, the method would be analogous to that described here. Metadata, such as associated with the FTL on a memory module may not need to be migrated. Once the data has been migrated to another memory module, the location mapping and other history maintained by the FTL or other metadata will be created during the process of migration of the data to the new module and will reside on the new module without the need to have been migrated per se.

Referring again to FIG. 15, consider the situation where all of the storage modules M1-M4 are functioning, but that M4 is a module that has no user data stored thereon, and for the purposes of this discussion, is capable of accepting all of the user data on module M2.

A procedure similar to that used for RAID stripe reconstruction may be used to perform the migration of data to a new storage module. Here, where there is no data recovery to be performed, the data reconstruction techniques previously described need not be performed. However, the atomaticity of the migration operation with respect to the RAID stripe needs to be maintained. That is, if during the migration of data from M2 to M4, a write operation were to have been performed to the LBA being migrated, a loss of data coherence would occur. For example, if a WRITE operation were performed to the corresponding LBAs of M1 and M3 during the time that the data for the corresponding LBA in M2 was being moved to M4, later arriving data being transferred from M2 to M4 would overwrite the data just written to M4 by the write operation. In this circumstance, the last data written to the LBA on M4 would be stale, and inconsistent with the remainder of the data in the RAID stripe of the LPA. Depending on whether this out-of-date data is data or parity data, the error may occur immediately upon the next read operation when the data or the parity data used as part of an erase hiding configuration would be incorrect, or during a reconstruction operation after a failure, where the parity data would be incorrect, and the reconstructed data would also be incorrect.

This situation may be avoided by an approach that is similar to that used for RAID reconstruction. A READ-migrate command may be addressed to the all of the LBAs of the RAID group. The READ-migrate command may be assigned a GSN as previously described. In this example, the READ-migrate command may be issued to the LBA on M1, M2 and M3, including the LBA to be written on M4. The command may be structured such that only the module from which the data is to be transferred actually returns data to the migrating controller. However, the READ-migrate command blocks any subsequent WRITE operations (except a WRITE-migrate operation) to the LBA on all of the storage modules of the stripe and the new location of the migrated data, M1-M4. At the time that the READ-migrate command is issued, the mapping of the RAID stripe is changed so that the destination storage module (in this case M4) is mapped, and the source storage module (in this case M2) is unmapped. So, any further read or write operations will be directed to the storage module to which the data is being migrated.

Until the data read from the LBA on M2 is actually written to the destination storage module M4, subsequent read and write operations for that LBA are blocked by the READ-migrate command for all of the mapped storage modules. The data to be migrated is routed to the LBA on M4 and written to the corresponding LBA. At this juncture, the blockage of writing or reading to the LBA of the stripe of data may be released. This may be performed by issuing the WRITE-migrate command with the same GSN as the READ-migrate command. The WRITE-migrate command sent to the new LBA location may have the data being migrated as the payload, For the storage modules of the RAID stripe from which data has not been migrated, the WRITE-migrate command may not have an associated data payload, but have the effect of cancelling the READ-migrate command so as to permit continued operation of the memory system with respect to the LBA of the RAID stripe that has just had a portion thereof migrated.

Since the effect of the READ-migrate command was similar to that of the READ-reconstruct command, read and write commands that have been queued with respect to the LBA that was migrated may be dispositioned in a manner similar to that previously described for the RAID reconstruction operation.

READ-migrate commands may have associated parameters, so that the data being migrated may be sent directly to the destination module (M4 in this example), or routed through the RC or a migration-specific controller.

The action of blocking WRITE commands directed towards the LBA segment that is being reconstructed may be effected by various techniques. For example, the metadata on each storage module that is associated with the LBA of the RAID stripe may be modified so as to return a value other than that of the physical memory location, so that the metadata acts as a flag to indicate that the write command needs to be temporarily blocked. The arrival of a WRITE-reconstruct or a WRITE-migrate command may serve to modify the metadata for the LBA so that the effect of the READ-reconstruct or READ-migrate commands is obviated. Where the WRITE-reconstruct or the WRITE-modify command is accompanied by a data payload, the data will be written to the storage memory for retention. Where there is no accompanying data, the previous data is not modified, however, subsequent READ or WRITE commands may be executed to read or write data. Of course, if the data is available in a cache, that data may be used.

The description of RAID rebuilding and data migration has been described for a particular simplified system arrangement for clarity, but it is evident that the system architectures of FIG. 3 and FIG. 4, as well as other system architectures are compatible with the techniques describe herein. The DRAM cache may be located, for example, at the MC of FIG. 3, the data buffer 210 of FIG. 14 or elsewhere.

Ranges of LBAs may be migrated as a group. Such a group of LBAs may comprise all of or part of a LUN. That is, an external application may have been assigned a block of LBAs for use. This block of LBAs may comprise a subset of the LBAs recognized by the memory system 300. From an external viewpoint the using application may appear to address a LUN and an LBA, however a mapping may be performed between the LUN-LBA recognized by the user and the LBA of the memory system. Such a mapping may be performed as an operation of the RC, as each LUN may have different attributes. For example, different LUNs may have different RAID stripe characteristics or other service-related attributes. So, the mapping of a LBA of a LUN to the LBA space of the memory system 300 may serve to characterize there services performed by the memory system 300 with respect to the user requirements.

While the underlying memory system 300 may operate as a flat address space having a large and potentially extensible memory, individual users of the memory system as a service may not need a memory of the size available. Moreover, individual users may have different data protection, data reliability, system availability, latency or other service parameters that are specific to the user of the user application. A user may also have a plurality of different application programs that are serviced by the memory system 300. Such uses of a memory system are often described as virtualization. In essence a portion of the memory area may be defined as a logical unit and given a Logical Unit Number (LUN). The user application may them store and retrieve data from a memory area having LBAs, which are associated with the LUN and not with the memory system per se. A mapping may be performed such that the LUN and LBA are mapped into the overall LBA space of the memory system 300. The LBA space of the memory system 300 may then be managed so as to provide the specified service characteristics in a manner that is transparent to the user.

In an aspect, a plurality of memory areas MA comprising the user accessible memory space of the memory system 300 may be defined so that each of the plurality of memory areas MA has a contiguous range of LBAs, and particular performance characteristics. The performance characteristics may be established based on a predetermined basis to service particular user requirements. One or more of the MAs may be grouped to form a LUN that is known to and accessible by a user, and it is this LUN and a logical address within the LUN that the user addresses to read and write data.

When an application program supplies a LUN and associated LBA, the memory system 300 associates the LUN and LBA with one or more of the MAs and a logical address within the memory system 300 address space. As the LBA address word is larger than the physical memory (being, for example, 64 bits), address space may be contiguous or non-contiguous, and additional physical memory may be added so as to scale up the size of the memory system 300. This may be done by various techniques including networking, adding further memory arrays 300 to a switch fabric 20, or the like.

Such an arrangement may serve well initially, however, users may discontinue service, may change the desired terms of service, increase or decrease total memory requirements, and the like. So, over time, various LUNs may be de-allocated, and become available for other users. However, the service characteristics of the associated MA may not be appropriate for the new user. New MAs may be constructed from existing MAs by migrating the LBAs of the existing MAs to another storage module or storage modules of the memory system 300. Similarly, when additional memory systems 300 are added within the addressable space, larger LUNs or LUNs with altered performance characteristics may be created, and data from an existing LUN migrated to the new LUN.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A memory system, comprising,
a plurality of system controllers;
a plurality of memory controllers communicating with at least some of the plurality of system controllers; and
a plurality of memory modules, wherein a group of memory modules is associated with a memory controller of the plurality of memory controllers,
wherein a same command from a system controller of the plurality of system controllers is dispatched to at least one of the plurality of memory controllers of the plurality of memory controllers and a unique global serial number (GSN) is assigned to the same command at each of the memory controllers that have received the same command once all instances of receipt of the same dispatched command have been acknowledged to the system controller of the plurality of system controllers by each of the memory controllers receiving the same command.

2. The memory system of claim 1, wherein the GSN is a continuous sequence of strictly monotonically increasing integers.

3. The memory system of claim 1, wherein the GSN is assigned to the same command at each memory controller such that the commands are sent by the memory controller to the each of memory modules to which a command is addressed in ascending order of the GSN value.

4. The memory system of claim 1, wherein the same command comprises specification of a function to be performed.

5. The memory system of claim 4, wherein the same command has an associated data payload.

6. The memory system of claim 5, wherein the data payload of the command sent to a memory module of the plurality of memory modules is a strip of a plurality of strips of a stripe of a RAIDed data chunk.

7. The memory system of claim 6, wherein the chunk is a page of data and the strips include an error correcting code for the data.

8. The memory system of claim 7, wherein each of the commands associated with strips of a same stripe has a same GSN.

9. The memory system of claim 1, wherein the same command is selected from commands to perform operations of read data or write data.

10. The memory system of claim 1, wherein at least two of the plurality of system controllers communicate with an external environment through a network configurable to route user data and commands to any one of the at least two of the plurality of system controllers.

11. The memory system of claim 1, wherein a system controller of the plurality of system controllers is operable to receive a data chunk and to:
allocate portions of the data chunk to a plurality of memory modules as strips of a stripe in accordance with a RAID algorithm;
compute an error correcting code for the data chunk, and allocate the strip comprising the error correcting code to a memory module in accordance with the RAID algorithm;
transmit the strips to memory controllers in communication with the memory modules to which the strips have been assigned along with a write command;
determine that the strips have been successfully been received by the memory modules;
request a global sequence number (GSN); and
associate the GSN with the stripe of the data chunk and the error correcting data.

12. The memory system of claim 1, further comprising operating the plurality of system controllers such that, when receipt of the same command has been acknowledged to the system controller of the plurality of system controllers by each of the memory controllers receiving the same command by the system controller, the system controller requests a GSN in accordance with a protocol.

13. The memory system of claim 12, wherein a token is passed by the system controllers amongst a group of system controllers and each system controller of the group of system controllers assigns a quantity of GSNs corresponding to a number of pending GSN requests at a first system controller, and passes the token and the current GSN to a second system controller in accordance with a protocol.

14. The memory system of claim 13, wherein the protocol is a round-robin.

15. The memory system of claim 12, wherein a group of system controllers communicate with each over a communications path such that each of the system controllers communicates with each of the other of the group of system controllers, and, when receipt of the same command has been acknowledged to the system controller of the plurality of system controllers by each of the memory controllers receiving the same command by the system controller, the system controller requests a GSN in accordance with a protocol.

16. The memory system of claim 15, wherein a group of requests for GSN received during an interval are processed together.

17. The memory system of claim 16, wherein the acknowledgment of receipt of a same command is acknowledged to all of the system controllers of the group of system controllers.

18. The memory system of claim 1, wherein when a command pending in a memory controller receives a GSN, the pending commands for a memory module having the lowest GSN is transmitted to the memory module.

19. The memory system of claim 18, wherein a local serial number (MMSN) is assigned to each command sent to a memory module that is intended to be executed in a time-ordered manner.

20. The memory system of claim 19, wherein the MMSN is assigned in monotonic integral order within a known range of values and formed into a tuple with the GSN.

21. The memory system of claim 1, wherein when a same command from a system controller of the plurality of system controllers is dispatched to at least one of the plurality of memory controllers of the plurality of memory controllers, a same local sequence number (LSN) is associated with each a same command.

22. The memory system of claim 21, wherein the receipt of the same command at each of the memory controllers is determined by a receipt of an acknowledgement from all of memory modules to which a command with the same LSN has been sent.

23. The memory system of claim 1, wherein a tuple of the LSN and the GSN are transmitted to at least the memory controllers where the same command has been previously sent.

24. The memory system of claim 1, wherein the system controller is a RAID controller.

25. The memory system of claim 1, wherein the same command is sent to a plurality of memory controllers and each of the instances of the same command has an associated logical addresses corresponding to a strip of a RAID stripe.

26. The memory system of claim 1, wherein a value of the GSN is selected from a range of GSN numbers associated with a domain comprising a group of the plurality of system controllers.

27. The memory system of claim 26, wherein a first domain of system controllers is associated with a first group of memory controllers and a second domain of system controllers is associated with a second group of memory controllers.

28. The memory system of claim 27, wherein the first group of memory controllers and the second group of memory controllers at least partially overlap.

29. The memory system of 27, wherein the first group of memory controllers and the second group of memory controllers are in communication with at least one common memory module of the plurality of memory modules.

30. The memory system of claim 1, wherein a command received by a system controller is stored at the system controller until an execution of the command by the memory module to which the command has been sent has been acknowledged to the system controller.

31. The memory system of claim 30, wherein the GSN assigned to the command received by the system controller is associated with the command stored at the system controller.

32. The memory system of claim 31, wherein the stored command and associated GSN is mirrored to another system controller.

33. The memory system of claim 1, wherein the same command is a group of commands where the sequence of execution of the group of commands is controlled in accordance with the assigned GSN.

34. The memory system of claim 1, wherein the system controller and the memory controller are the same controller.

35. A method of operating a memory system, the method comprising:
receiving a request from an external source;
converting the request into at least one command for operation of a memory controller of a plurality of memory controllers of the memory system;
sending the command to at least one of the memory controllers;
receiving an acknowledgment of receipt of the command from the all of the memory controllers to which the command was sent;
assigning a global sequence number (GSN) to the command;
associating the GSN with the command at the memory controller; and,
for each memory module in communication with the memory controller:
sending the command with the lowest GSN and addressed to the memory module to the memory module.

36. The method of claim 35, further comprising associating a data packet with the command to be sent to each memory modules.

37. The method of claim 36, wherein each of data packets assigned to the command is a strip of a data stripe of a RAID data group or parity data for the RAID data group.

38. The method of claim 35, wherein the GSN is assigned in accordance with a protocol and is continuous sequence of strictly monotonically increasing integers selected from a range of integers.

39. The method of claim 35, wherein the same command is a group of commands where the sequence of execution of the group of commands is controlled in accordance with the assigned GSN.

40. The method of claim 35, wherein the system controller and the memory controller are the same controller.

41. A computer software product stored on a non-volatile computer readable medium, comprising:
instructions causing a processor to perform the steps of:
receiving a request from an external source;
converting the request into at least one command for operation of a memory controller of a plurality of memory controllers of the memory system;
sending the command to at least one of the memory controllers;
receiving an acknowledgment of receipt of the command from the all of the memory controllers to which the command was sent;
assigning a global sequence number (GSN) to the command;
associating the GSN with the command at the memory controller; and, for each memory module in communication with the memory controller:
sending the command with the lowest GSN and addressed to the memory module.

42. A memory system, comprising,
a plurality of RAID controllers;
a plurality of memory controllers communicating with at least some of the plurality of RAID controllers; and
a plurality of memory modules, wherein a group of memory modules is associated with a memory controller of the plurality of memory controllers,
wherein a same command from a RAID controller of the plurality of RAID controllers is dispatched to at least two of the plurality of memory controllers of the plurality of memory controllers and a unique global serial number (GSN) is assigned to the same command at each of the memory controllers when receipt of the same command is acknowledged to the RAID controller by the at least two memory controllers; and, a sequence of execution of commands received at the at least two memory modules is in accordance with a protocol.

43. The memory system of claim 42, wherein the same command is a plurality of WRITE commands sent to the memory controllers in communication with a group of memory modules of the plurality of memory modules comprising a RAID group to which strips of a stripe are to be written.

44. The memory system of claim 43, wherein each of the strips of a stripe of the data written has a WRITE command of the plurality of write commands characterized by a logical block address to which the strip is to be written.

45. The memory system of claim 43, wherein data associated write command having a lower GSN is written to a logical block address before data associated with a higher GSN.

46. The memory system of claim 43, wherein the same command is a plurality of READ commands sent to the memory controllers in communication with a group of memory modules of the plurality of memory modules comprising a RAID group.

47. The memory system of claim 42, wherein the protocol is that the command having a lower numerical value of GSN at the memory module is executed prior to the command having a higher numerical value of GSN.

48. The memory system of claim 42, wherein commands are selected from a group including at least one of READ data or WRITE data.

49. The memory system of claim 48, wherein a WRITE data command has an associated data payload.

50. The memory system of claim 49, wherein the associated data payload is stored in memory at a base address and address range specified as parameters of the WRITE data command.

51. The memory system of claim 50, wherein the group of commands comprises a plurality of command types.

52. The memory system of claim 50, wherein the group of commands is associated with one of reading data from an address range on memory modules of the plurality of memory modules comprising a stripe of a RAID group or writing data to addresses ranges of memory modules of the plurality of memory modules comprising a stripe of a RAID group.

53. The memory system of claim 52, wherein the sequence of operations performed on a memory address is ordered such that command associated with a lower GSN is performed before a command associated with a higher GSN.

\* \* \* \* \*